(12) United States Patent
Deschambault et al.

(10) Patent No.: US 11,877,548 B2
(45) Date of Patent: Jan. 23, 2024

(54) CLOSED LOOP VERTICAL DISENGAGEABLE AEROPONIC GROWING SYSTEM

(71) Applicant: CYCLOFIELDS INDOOR FARMING TECHNOLOGY INC., Granby (CA)

(72) Inventors: Eric Deschambault, Granby (CA); Antoine Deschambault, Granby (CA)

(73) Assignee: CYCLOFIELDS INDOOR FARMING, Grandby (CA)

( * ) Notice: Subject to any disclaimer, the term of this patent is extended or adjusted under 35 U.S.C. 154(b) by 78 days.

(21) Appl. No.: 17/484,426

(22) Filed: Sep. 24, 2021

(65) Prior Publication Data
US 2022/0087123 A1    Mar. 24, 2022

Related U.S. Application Data

(60) Provisional application No. 63/082,488, filed on Sep. 24, 2020.

(51) Int. Cl.
*A01G 31/06*    (2006.01)
*A01G 31/04*    (2006.01)

(52) U.S. Cl.
CPC ........... *A01G 31/06* (2013.01); *A01G 31/042* (2013.01)

(58) Field of Classification Search
CPC .................................................. A01G 31/042
See application file for complete search history.

(56) References Cited

U.S. PATENT DOCUMENTS 2,244,677 A    6/1941   Cornell
3,254,447 A    6/1966   Ruthner
(Continued)

FOREIGN PATENT DOCUMENTS

CA    2518789 A1    3/2006
CA    2733098 C     2/2010
(Continued)

OTHER PUBLICATIONS

International Search Report, 9 pages, Alison Canteenwalla, Dec. 20, 2021.
(Continued)

*Primary Examiner* — Joshua D Huson
*Assistant Examiner* — Katherine Anne Kloecker
(74) *Attorney, Agent, or Firm* — Benoit&Cote Inc.; Mathieu Audet

(57) ABSTRACT

An aeroponic growing system includes a plurality of parallel vertical aeroponic growing apparatuses each having a closable loop articulated wall made up of vertical strips or panels that are pivotally attached side-by-side together with flexible joints. The motor-driven articulated wall moves on rails as an oblong-shaped carousel. The panels are provided with numerous plant-growing cups such that the growing plant extends outwardly out of the cup while the roots thereof are located inwardly of the wall. A spraying system delivers nutrients to the roots in darkness. On the external side, plants are exposed to controlled lighting provided by a programmable vertical LED system. Every growing step of the plants is optimized and supported by sensors and interactive software. The articulated wall is disengageable from its aeroponic growing apparatus to be displaced along a railing system between a grow room and other areas, and/or inverted for the roots to face outward.

19 Claims, 35 Drawing Sheets

(56) References Cited

U.S. PATENT DOCUMENTS

| | | | |
|---|---|---|---|
| 4,255,897 A | 3/1981 | Ruthner | |
| 4,356,664 A * | 11/1982 | Ruthner | A01G 31/042 47/17 |
| 5,511,340 A | 4/1996 | Kertz | |
| 5,555,676 A | 9/1996 | Lund | |
| 6,840,007 B2 | 1/2005 | Leduc et al. | |
| 7,188,451 B2 | 3/2007 | Marchildon | |
| 7,401,437 B2 | 7/2008 | Dumont | |
| 7,559,173 B2 | 7/2009 | Brusatore | |
| 7,818,917 B2 * | 10/2010 | Brusatore | A01G 31/047 47/59 R |
| 7,877,927 B2 | 2/2011 | Roy et al. | |
| 7,984,586 B2 | 7/2011 | Brusatore | |
| 8,505,238 B2 | 8/2013 | Luebbers et al. | |
| 8,533,992 B2 | 9/2013 | Harwood | |
| 8,533,993 B2 | 9/2013 | Pettibone | |
| 8,782,948 B2 | 7/2014 | Harwood et al. | |
| 9,374,953 B2 | 6/2016 | Martin et al. | |
| 9,545,060 B2 | 1/2017 | Wiggins et al. | |
| 9,591,814 B2 | 3/2017 | Collins et al. | |
| 9,730,400 B2 | 8/2017 | Wilson et al. | |
| 9,788,495 B2 | 10/2017 | Martin et al. | |
| 9,883,642 B2 | 2/2018 | Friedman | |
| 10,094,116 B2 | 10/2018 | Mawendra | |
| 10,225,994 B1 | 3/2019 | Johnson et al. | |
| 10,264,737 B2 | 4/2019 | Johansson | |
| 10,271,485 B2 | 4/2019 | Benne et al. | |
| 10,299,442 B2 | 5/2019 | Vesty | |
| 10,306,847 B2 * | 6/2019 | Whitcher | A01G 9/246 |
| 10,568,275 B2 | 2/2020 | Millar et al. | |
| 10,618,530 B2 | 4/2020 | Carpenter et al. | |
| 10,681,881 B2 | 6/2020 | Barker et al. | |
| 10,736,285 B2 | 8/2020 | Smith et al. | |
| 10,765,074 B2 | 9/2020 | Deforche et al. | |
| 10,856,480 B2 | 12/2020 | Moffitt et al. | |
| 10,973,184 B1 | 4/2021 | Yin | |
| 11,129,344 B2 | 9/2021 | Mawendra | |
| 11,310,976 B1 * | 4/2022 | Cross | A01G 7/045 |
| 2006/0162252 A1 | 7/2006 | Lim | |
| 2009/0307973 A1 | 12/2009 | Adams et al. | |
| 2011/0225883 A1 | 9/2011 | Clifford | |
| 2012/0137578 A1 | 6/2012 | Bradford et al. | |
| 2013/0104453 A1 | 5/2013 | Hassle | |
| 2014/0000162 A1 | 1/2014 | Blank | |
| 2015/0059243 A1 | 3/2015 | Parker | |
| 2015/0250115 A1 | 9/2015 | Pickell et al. | |
| 2016/0021836 A1 | 1/2016 | Kernahan | |
| 2016/0029582 A1 | 2/2016 | Anderson et al. | |
| 2016/0302369 A1 | 10/2016 | Pickell et al. | |
| 2017/0055474 A1 | 3/2017 | Storey | |
| 2017/0118922 A1 | 5/2017 | Sherertz | |
| 2017/0142912 A1 * | 5/2017 | Gasmer | E04H 5/08 |
| 2017/0354100 A1 | 12/2017 | Snyder | |
| 2017/0354104 A1 | 12/2017 | Friedman | |
| 2018/0014486 A1 | 1/2018 | Creechley et al. | |
| 2018/0077884 A1 | 3/2018 | Barker et al. | |
| 2018/0235156 A1 | 8/2018 | Blair et al. | |
| 2018/0310489 A1 | 11/2018 | Roeser et al. | |
| 2018/0325056 A1 | 11/2018 | Stolzfus et al. | |
| 2019/0029200 A1 | 1/2019 | Mawendra | |
| 2019/0082617 A1 | 3/2019 | Moffitt et al. | |
| 2019/0133063 A1 | 5/2019 | Bateman et al. | |
| 2019/0159415 A1 | 5/2019 | Bertram et al. | |
| 2020/0015430 A1 | 1/2020 | Hawley-Weld et al. | |
| 2020/0236869 A1 | 7/2020 | Johnson et al. | |
| 2020/0275621 A1 | 9/2020 | Maman et al. | |
| 2020/0329654 A1 | 10/2020 | Westlind et al. | |
| 2020/0349476 A1 | 11/2020 | Diamos et al. | |

FOREIGN PATENT DOCUMENTS

| | | | |
|---|---|---|---|
| CN | 107801517 A * | 3/2018 | A01G 9/023 |
| CN | 112118730 A | 12/2020 | |
| DK | 2866551 T3 | 1/2020 | |
| EP | 1210868 A1 | 6/2002 | |
| EP | 2823705 B1 | 4/2018 | |
| EP | 3216342 B1 | 6/2020 | |
| EP | 3270684 B1 | 8/2020 | |
| EP | 3405021 B1 | 12/2020 | |
| EP | 3850941 A1 | 7/2021 | |
| GB | 2518361 A | 3/2015 | |
| JP | 2006507848 A | 3/2006 | |
| JP | 6116546 B2 | 4/2017 | |
| KR | 101086888 B1 | 11/2011 | |
| KR | 20130136226 A | 12/2013 | |
| KR | 101766364 B1 | 8/2017 | |
| KR | 101881368 B1 | 8/2018 | |
| KR | 101970026 B1 | 4/2019 | |
| KR | 20200022081 A | 3/2020 | |
| KR | 102146069 B1 | 8/2020 | |
| KR | 102254418 B1 | 5/2021 | |
| KR | 20210049856 A | 5/2021 | |
| KR | 102307753 B1 | 10/2021 | |
| RU | 2489847 C1 | 8/2013 | |
| RU | 2708795 C2 | 12/2019 | |
| TW | M367678 U | 11/2009 | |
| WO | 2004047521 | 6/2004 | |
| WO | 2004047521 A1 | 6/2004 | |
| WO | 2012054385 A1 | 4/2012 | |
| WO | 2012156710 A1 | 11/2012 | |
| WO | 2013132133 A1 | 9/2013 | |
| WO | 2014102553 A1 | 7/2014 | |
| WO | 2016018767 A1 | 2/2016 | |
| WO | 2016129674 A1 | 8/2016 | |
| WO | 2017058116 A1 | 4/2017 | |
| WO | 2017075689 A1 | 5/2017 | |
| WO | 2017091772 A1 | 6/2017 | |
| WO | 2017207508 A1 | 12/2017 | |
| WO | 2018013161 A1 | 1/2018 | |
| WO | 2018035314 A1 | 2/2018 | |
| WO | 2018158093 A1 | 9/2018 | |
| WO | 2018172947 A4 | 9/2018 | |
| WO | 2019030606 A1 | 2/2019 | |
| WO | 2020154767 A1 | 8/2020 | |
| WO | 2021055235 A1 | 3/2021 | |
| WO | 2021055257 A1 | 3/2021 | |
| WO | 2021055444 A1 | 3/2021 | |

OTHER PUBLICATIONS

International Search Report, 9 pages, Alison Canteenwalla, dated Dec. 20, 2021.

* cited by examiner

CLOSED LOOP VERTICAL DISENGAGEABLE AEROPONIC GROWING SYSTEM

CROSS-REFERENCE TO RELATED APPLICATION

This U.S. Patent Application is a non-provisional of and claims priority from U.S. Provisional Patent Application No. 63/082,488 filed Sep. 24, 2020, the specification of which is hereby incorporated herein by reference in its entirety.

BACKGROUND

(a) Field

The present subject matter relates to growing systems and, more particularly, to aeroponic growing systems.

(b) Related Prior Art

Aeroponics is a development of hydroponic growing methods. Hydroponics is the technique of growing plants in water-based solutions of nutrient salts.

Aeroponics is defined by the International Society for Soil-less Culture as "A system where roots are continuously or discontinuously in an environment saturated with fine drops (a mist or aerosol) of nutrient solution". The method requires no substrate and entails growing plants with their roots suspended in a chamber (the root chamber). The roots are periodically atomized with a fine mist or fog of nutrients, a process which uses significantly less water than alternative growing techniques, such as hydroponic methods. Since their inception some 30 years ago, aeroponics has gained much publicity over recent years, and aeroponic techniques have proved very successful for propagation and are widely used in laboratory studies of plant physiology. On the other hand, aeroponic systems still need to prove themselves on an industrial scale.

The two main advantages of the soilless cultivation of plants are, much higher crop yields, and the fact that aeroponics can be used in places where ordinary agriculture or gardening is impossible. This is not only a profitable undertaking, but one which has proved of great benefit to humanity. Indeed, people living in crowded cities, without gardens, can grow fresh vegetables and fruits in window boxes or on house roofs. By means of aeroponics all such places can be made to yield a regular and abundant supply of clean, health-giving greenstuffs. Not only town dwellers, but also country residents have caused to be thankful to soilless culture. Deserts, rocky and stony lands in mountainous districts or barren and sterile areas can be made productive at reasonable costs.

Other advantages include faster growth combined with relative freedom from soil diseases, very consistent crops, and the quality of the produce is excellent. There is also a considerable reduction in growing area, weeds are practically non-existent, while standard methods and automatic operations mean less labor, less cost, less nutrients and no hard manual work. Some plants can be grown out of season, and better control of crops naturally results in addition to there being no dirt and no smells.

It would therefore be desirable to provide an aeroponic growing apparatus.

SUMMARY

It would thus be desirable to provide a novel aeroponic growing apparatus.

It would also be desirable to provide a novel aeroponic growing system.

The embodiments described herein provide in one aspect an aeroponic growing apparatus, comprising a wall, a lighting system and a nutrient delivery system, the wall being provided with a plurality of containers each adapted for carrying at least one plant to grown therein, the containers being adapted for allowing roots of the plant to extend behind the wall whereas an opposed end of the plant can grow outwardly of the wall and is subject to light from the lighting system, the delivery system being adapted to provide nutrients to the roots.

For instance, the wall including a series of articulated panels connected together side-by-side, that can be embodied as a series of wall portions where the front wall portion is connected to the last wall portion forming a chamber therein, extends in a closed loop and is moveable along a path, a chamber being defined inwardly of the wall and housing the nutrient delivery system. For instance, railings are provided for guiding the wall along the path.

For instance, the railings include top railings, with the upper ends of the panels being respectively engaged to top railings.

For instance, an access entry is provided on the wall so as to allow access to the chamber.

For instance, flexible joints are provided for connecting the panels together.

For instance, the flexible joints are substantially opaque for assisting in maintaining darkness in the chamber.

For instance, the containers have different configurations and are adapted to be disposed in various patterns on the wall.

For instance, a motorization assembly is provided for driving the wall and selectively moving the wall along the path.

The embodiments described herein provide in one aspect an aeroponic growing system comprising a plurality of aeroponic growing apparatuses.

For instance, the aeroponic growing apparatuses are disposed substantially parallelly.

For instance, a service railing system is provided for removing the wall from an aeroponic growing apparatus thereof and for displacing the wall to at least one station.

For instance, the station includes at least one of an inverting station, picking/harvesting station, a sanitizing station, a seeding/transplantation station and a dormancy room.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which.

It will be noted that throughout the appended drawings, like features are identified by like reference numerals.

DETAILED DESCRIPTION

Figure 6:
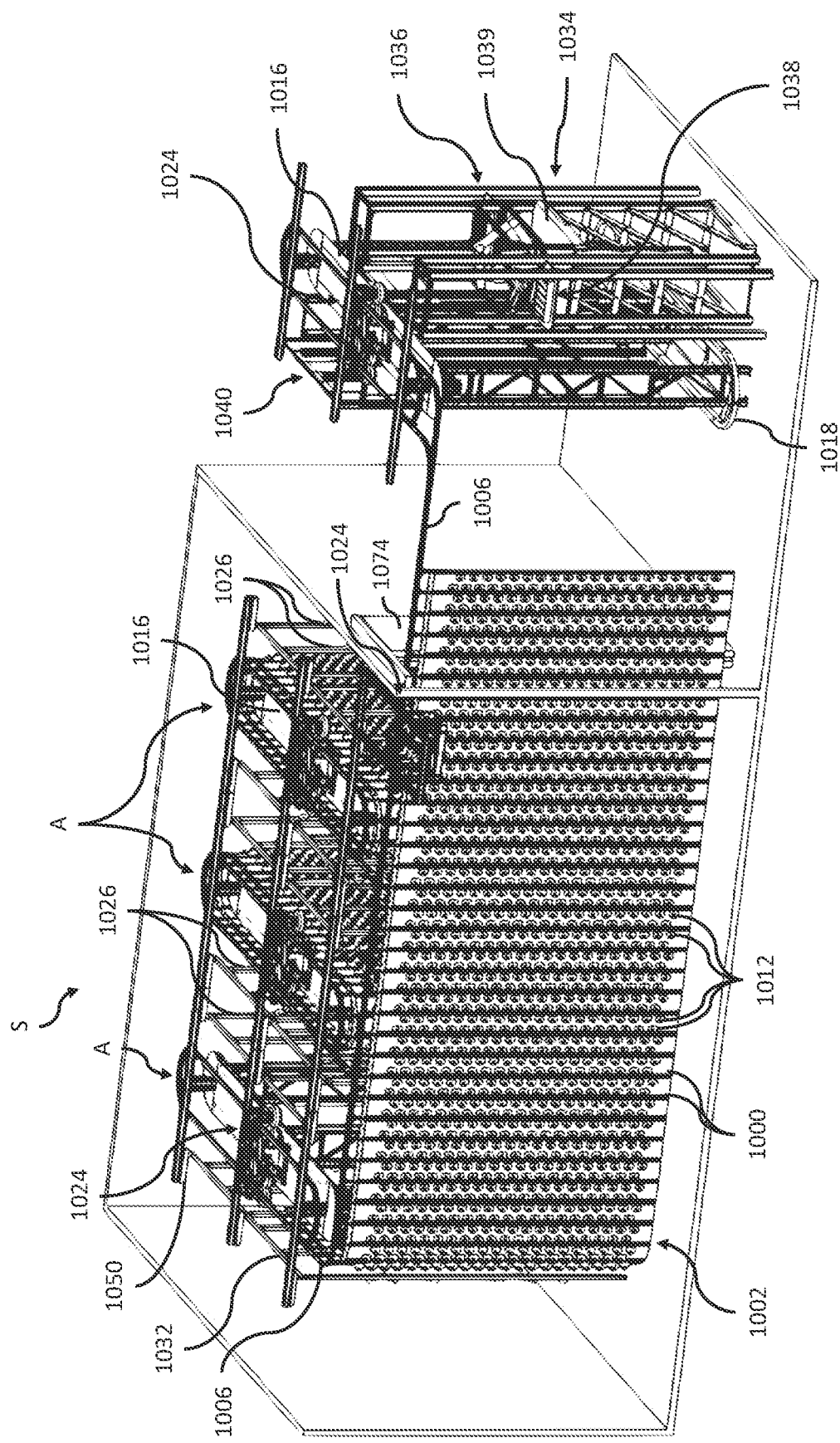
FIG. 6 is a perspective view showing an aeroponic growing system including a series of aeroponic growing apparatuses of FIG. 1 and additional stations, in accordance with another exemplary embodiment.

The present subject matter relates to an adjustable speed rotary wall chain industrial aeroponic system. More particularly, FIG. 6 illustrates an aeroponic growing system S, which includes a number of aeroponic growing apparatuses A and additional stations, as described hereinafter. The aeroponic growing apparatus A is shown in substantial isolation in FIGS. 1 to 3.

The aeroponic growing apparatus A takes the form of a carousel and comprises a moveable articulated wall 1002 that includes a number of vertically elongated panels 1000, for instance in the form of inert material strips. The panels 1000 are pivotally mounted side-by-side to one another along vertical longitudinal edges thereof. The elongated panels 1000 are pivotally mounted to each other via flexible and opaque joints 1010 (see FIGS. 2 and 14), which are adapted to substantially ensure water tightness and to substantially prevent light from entering the dark environment inside the moving carousel, i.e., the chamber within the articulated wall 1002. The articulated wall 1002 forms a, e.g., closed loop having a general oblong shape ("racetrack" configuration).

The elongated panels 1000 are made, according to a realization, of white ABS material processed against UV light, such material having the advantage of reflecting a good ratio of light, and a co-extrusion of black plastic which is designed to prevent the light to pass through the wall 1002 and reach the other side of the wall 1002.

Figure 14:
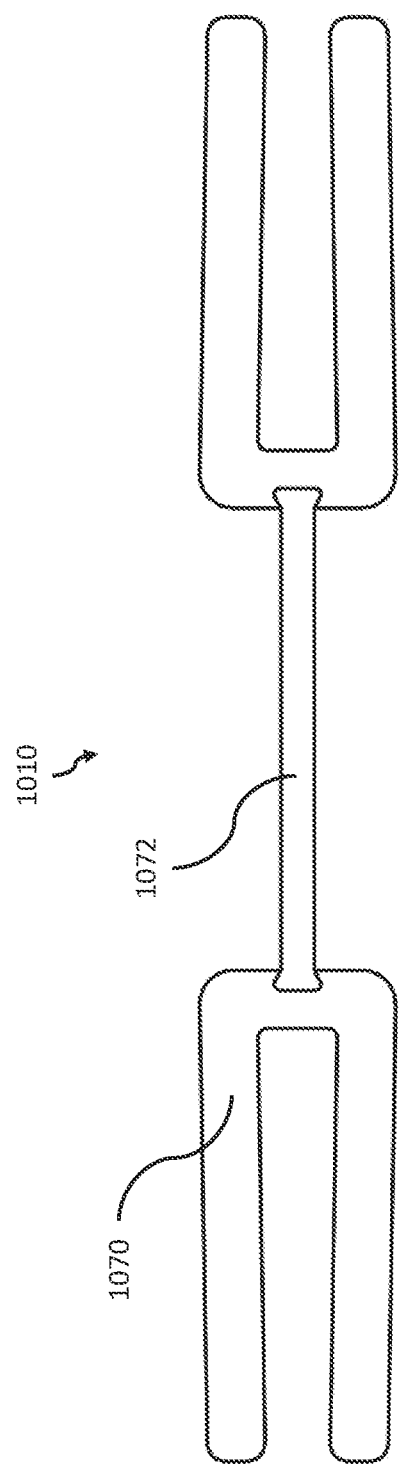
FIG. 14 is a top view of a joint in accordance with an embodiment.

Referring to FIG. 14, the flexible and opaque joints 1010 comprises a pair of U-shaped extremities 1070 made of PVC rigid material, typically white PVC, with the edges of the elongated panels 1000 being inserted in the clearance between the two arms of the U-shaped extremities 1070. A flexible body 1072 joins the two extremities 1070, with the flexibility characteristics of the body 1072 being selected in function of the range of acceptable angles the walls 1002 may undergo when a carousel, or when being displaced from a first aeroponic growing apparatuses A, e.g., in the growing area, to another aeroponic growing apparatuses A, e.g., workstation 1034, and during other processes as will be discussed hereinafter. Typically, the flexible body 1072 is made of black PVC. The whole flexible and opaque joints 1010 is processed against UV light. The whole, or at least the body 1072, is opaque; preventing, as discussed, water and light to travel between the panels 1000 forming the walls 1002.

Figure 15:
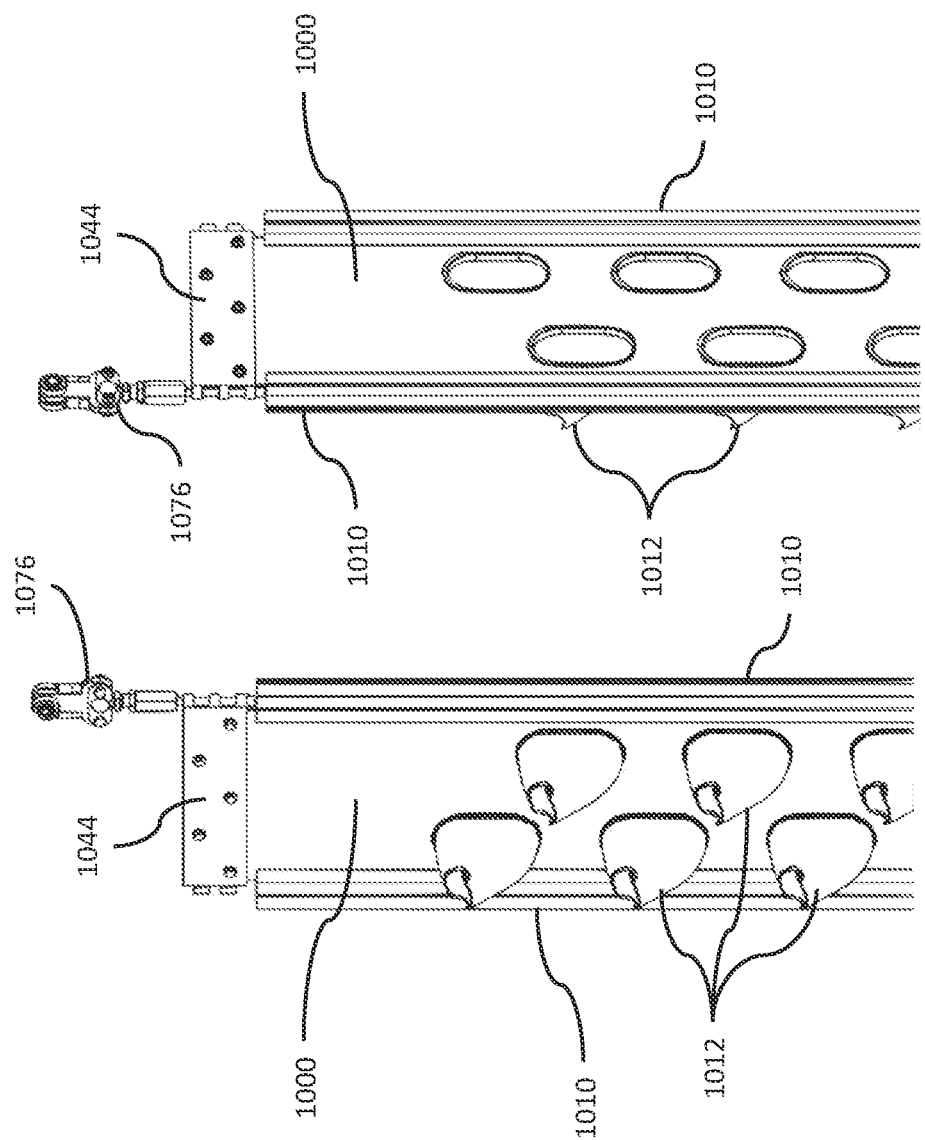
FIGS. 15A and 15B are respectively a perspective view of a front top portion and of a rear top portion of a wall with plant-growing containers (cups) mounted thereto in accordance with an embodiment.

Referring to FIGS. 15A and 15B, it is depicted an elongated panel 1000 having flexible and opaque joints 1010 mounted to its side edges, and inert material cups 1012 mounted to the openings of the elongated panel 1000. It is further depicted the chain 1044 taking place about the top edge of the elongated panels 1000 and a rail attachment member 1076 extending beyond the top edge and adapted to cooperate with the top railings 1004.

Figure 16:
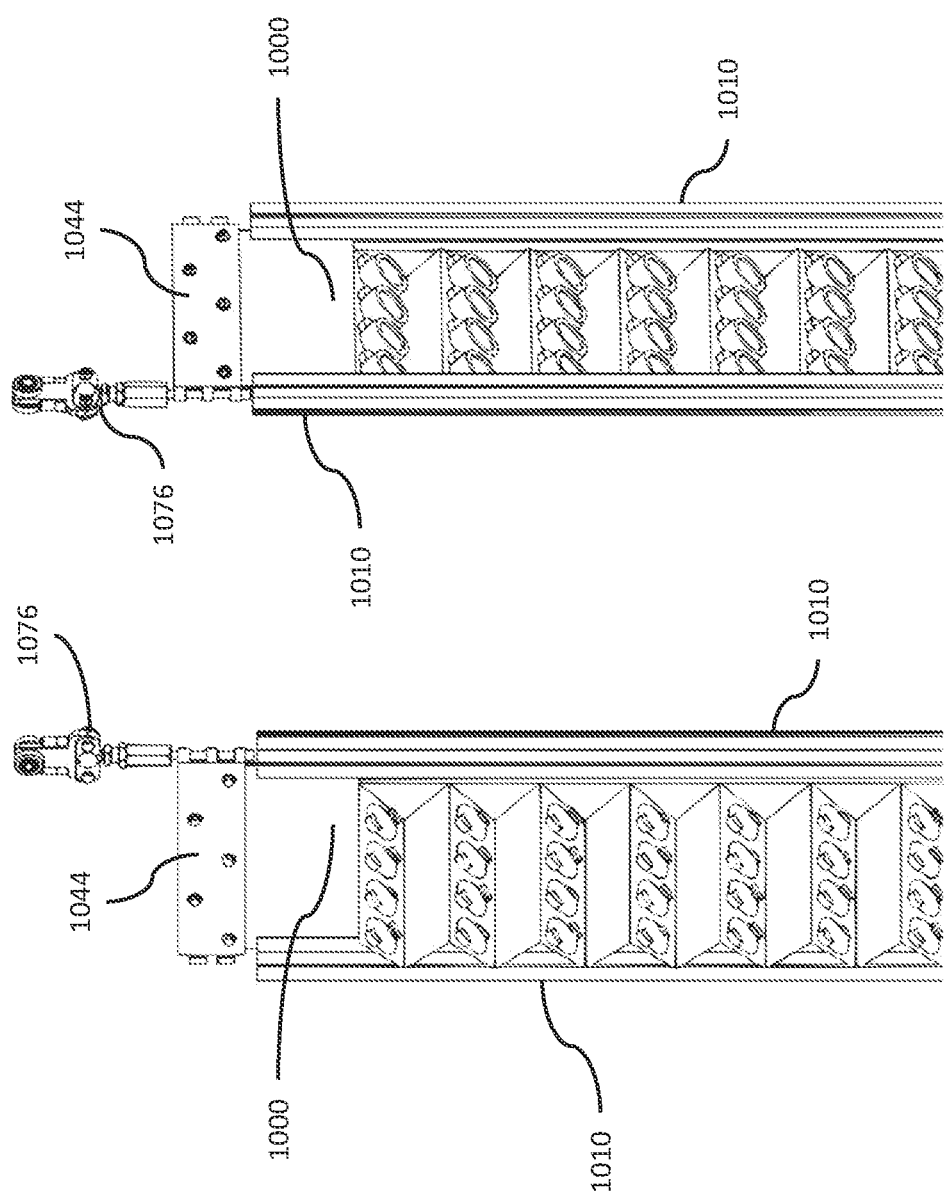
FIGS. 16A and 16B are respectively a perspective view of a front top portion and of a rear top portion of a wall with integrated plant-growing containers in accordance with an embodiment.

Referring to FIGS. 16A and 16B, another realization involves a high-density elongated panel 1000 manufactured with sloped portions adapted to the grown of the plants. The sloped portions provide a slightly upwardly orientation for the plants on the stem side and a downwardly sloped surface on the root side wherein the roots may lay down, and providing the slope desired for the appropriate spraying of the nutrients. According to a realization, the elongated panels 1000 are thermoformed with the depicted shape.

Figure 21:
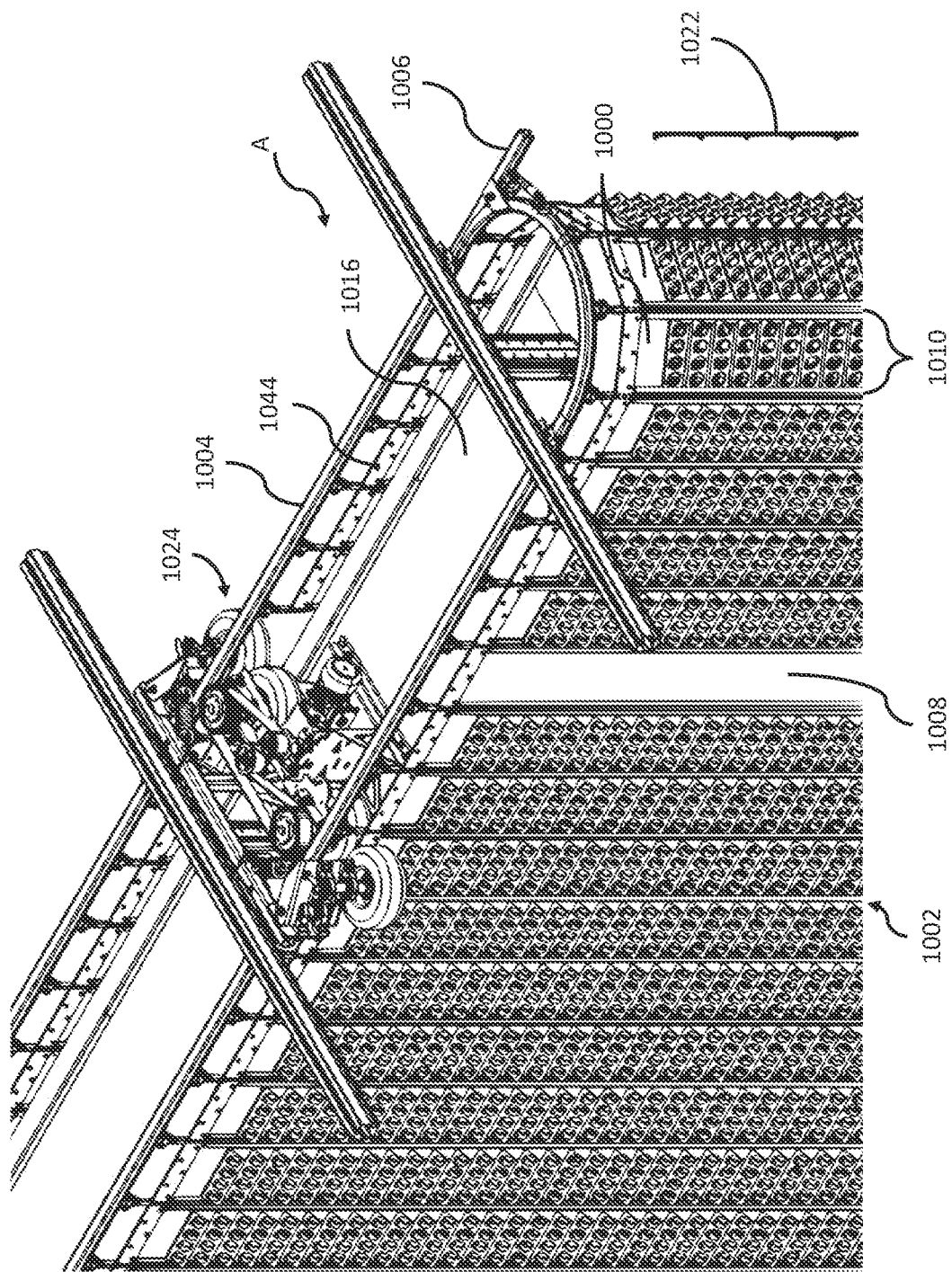
FIG. 21 is an enlarged perspective view of an upper portion of the aeroponic growing apparatus in accordance with an embodiment using the panels of FIGS. 16A and 16B.
Figure 22:
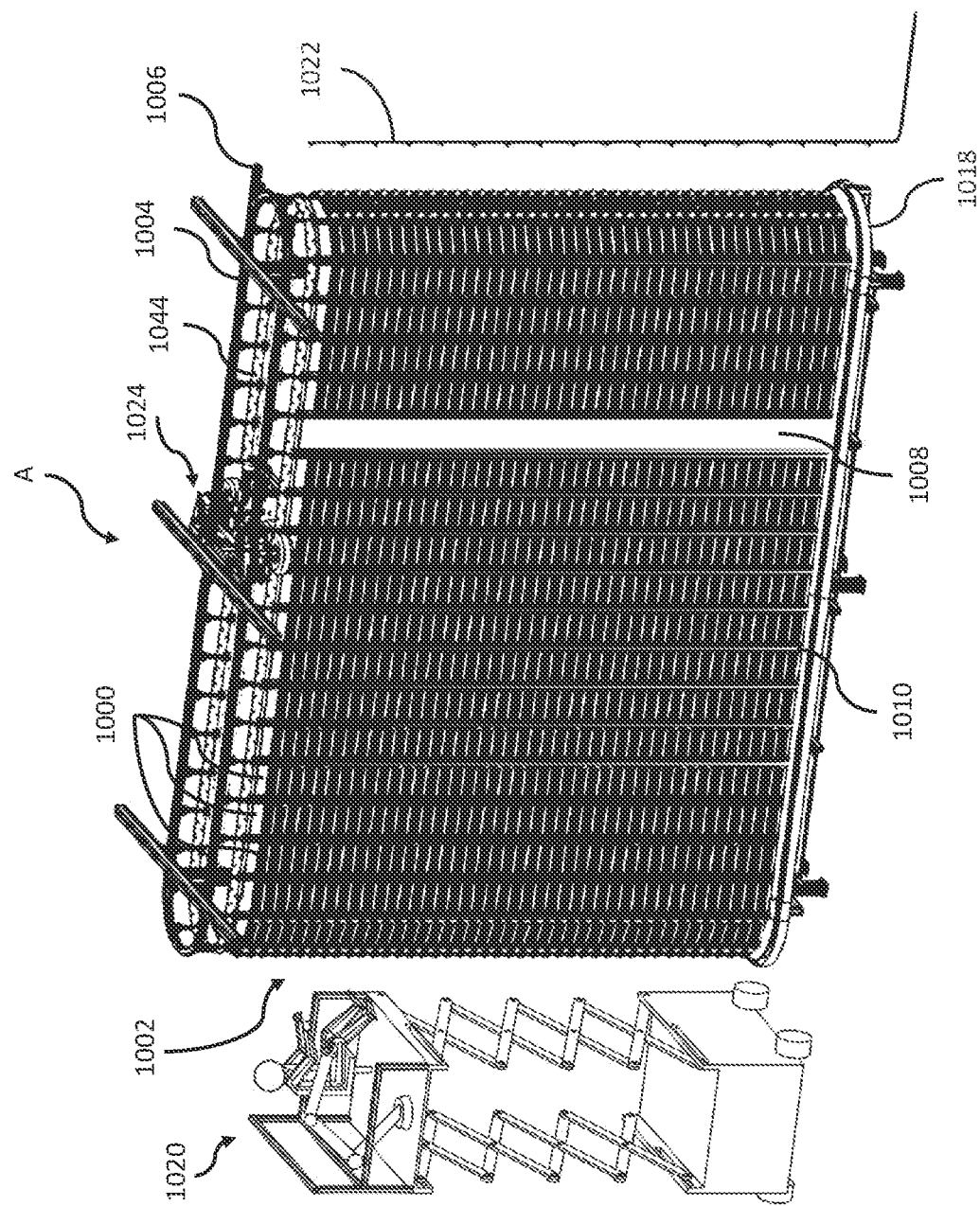
FIG. 22 is a perspective view of an aeroponic growing apparatus in accordance with the exemplary embodiment of FIG. 21.

FIGS. 21 and 22 depict an embodiment using the high-density elongated panels 1000 of FIGS. 16A and 16B, wherein such configuration is well adapted to small plants.

According to alternative realizations (not depicted), other configurations of plant-growing containers and slopes that are well suited for particular usages are contemplated through the present description.

The aeroponic growing apparatus A also includes variable speed motorization assembly 1024 to selectively drive the articulated wall 1002 when operating as a carousel, e.g., selectively clockwise and anti-clockwise, and top railings 1004 (FIG. 3) for guiding the elongated panels 1000 during the driven displacement of the articulated wall 1002, the elongated panels 1000 having upper ends thereof engaged respectively in the top railings 1004.

It is worth noting that driving the articulated walls 1002 allows to selectively change the location of the elongated panels 1000, and the plants mounted thereto, which permits to better balance the lighting between the plants and thus to optimize the lighting according to the requirements of all the plants.

According to a realization, driving of the articulated walls 1002 involves the articulated walls 1002 having a driving structure, e.g., a chain 1044, about the top with the variable speed motorization assembly 1024 comprising a set of engaging devices, e.g., tires 1042, engaging both sides of the chain 1044 to drive the aeroponic growing apparatus A therethrough. According to a realization, the variable speed motorization assembly 1024 comprises a plurality of panel-contacting drive members, embodied in the present situation as four (4) tires 1042 mounted in pairs, driven by the same motor (not identified) and through straps (not identified), wherein each pair of tires 1042 exerts a coordinated displacement of a different panel 1000 with friction to thereby drive the whole wall 1002.

Figure 1:
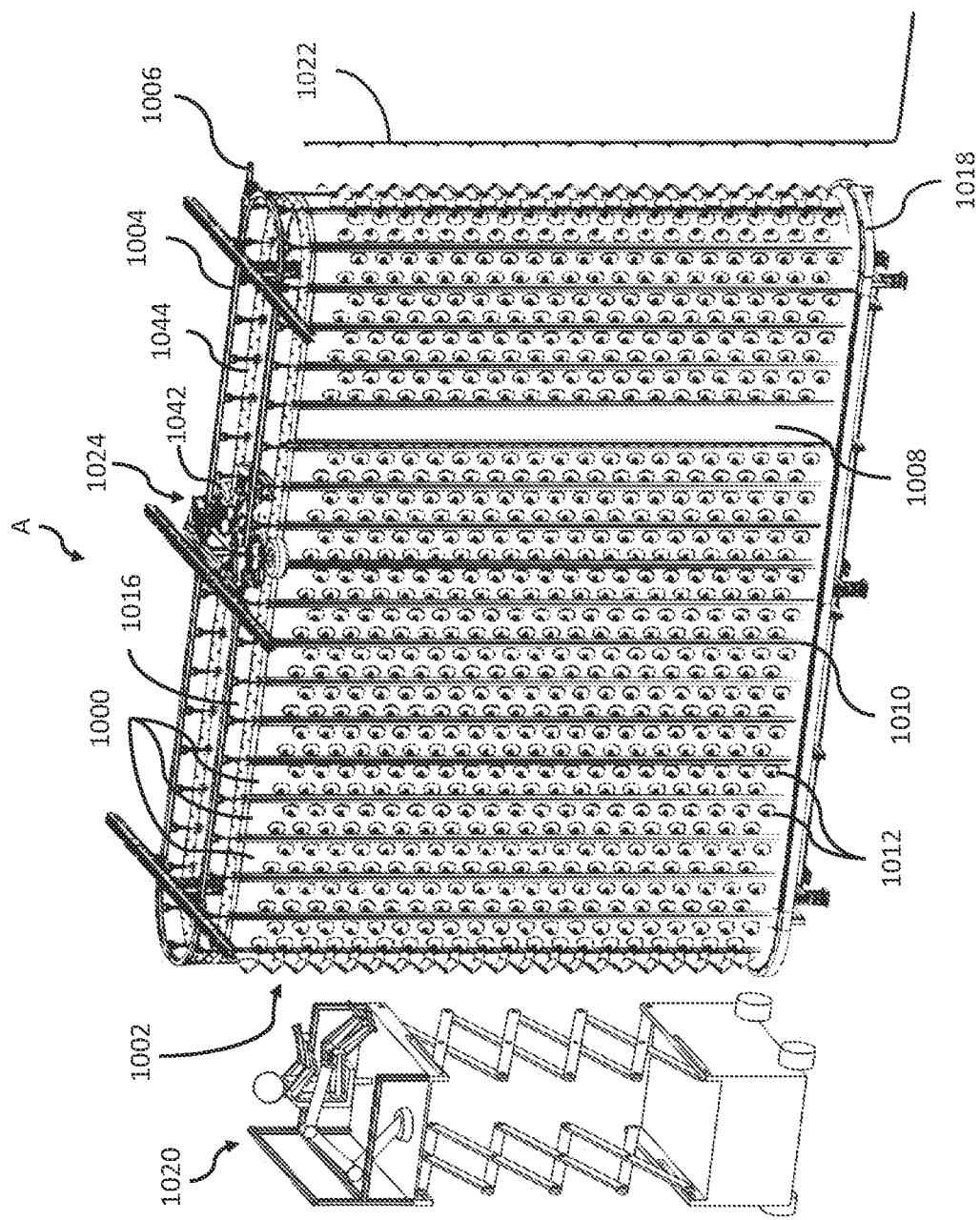
FIG. 1 is a perspective view of an aeroponic growing apparatus in accordance with an exemplary embodiment.
Figure 2:
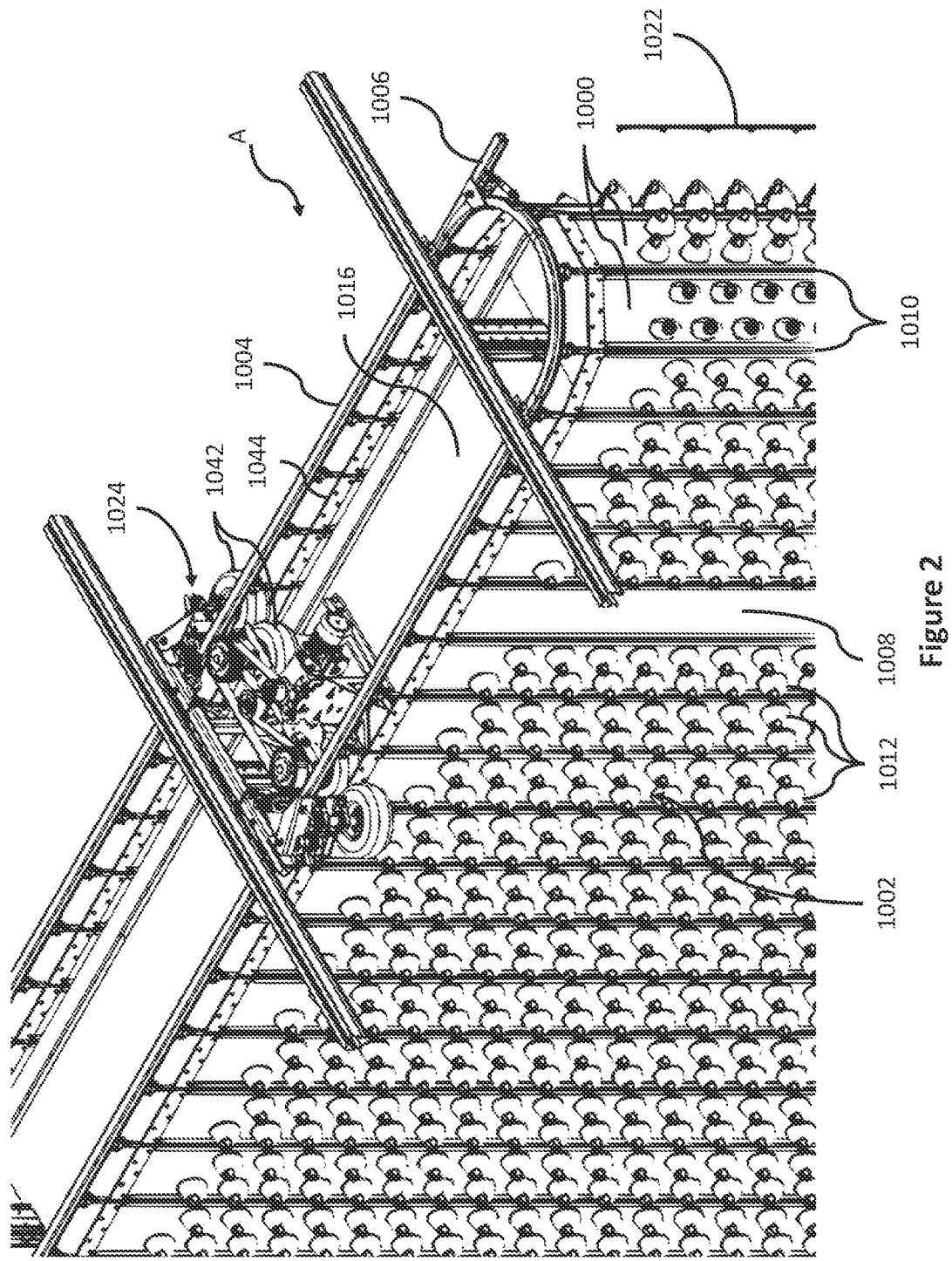
FIG. 2 is an enlarged perspective view of an upper portion of the aeroponic growing apparatus of FIG. 1.
Figure 3:
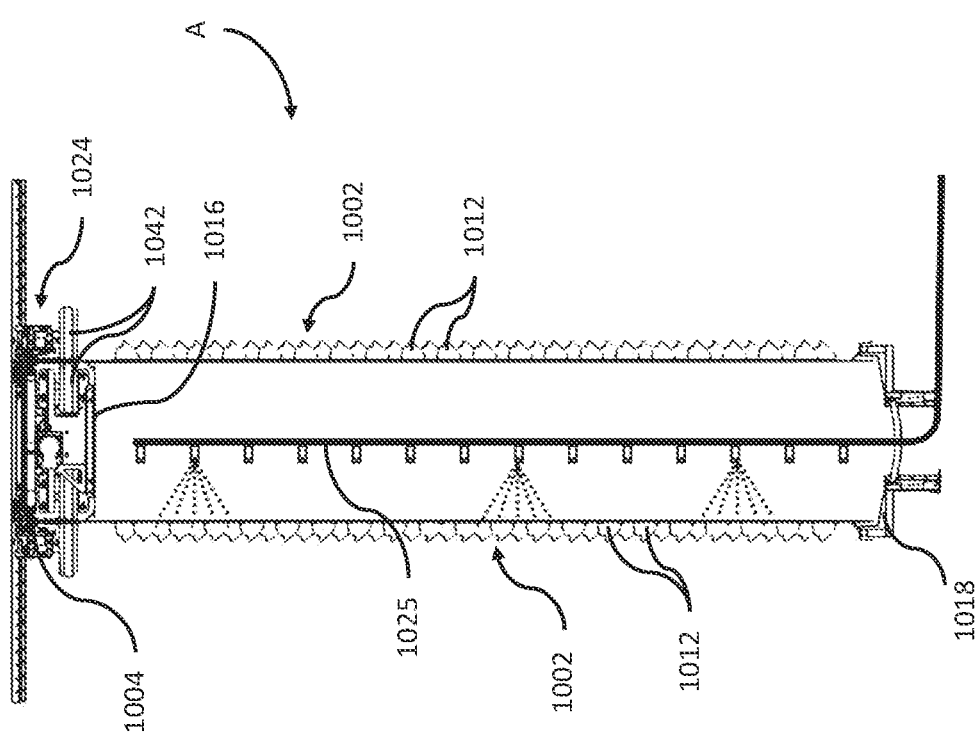
FIG. 3 is a schematic vertical transversal cross section view of the aeroponic growing apparatus of FIG. 1.

Referring to FIGS. 1 and 2, the articulated wall 1002 is provided with an access point 1008 for maintenance and inspection of the inside of the carousel or aeroponic growing apparatus A. The aeroponic growing apparatus A also includes top covers or shields 1016, with the top ones seen in FIG. 2, in order to prevent light from entering the carousel.

Referring to FIG. 1, there is also provided a pan 1018 at the lower end of the aeroponic growing apparatus A to collect residual solutions, e.g., nutrients and water. The shields 1016 and pan 1018 comprises brushes comprising a double membrane of EPDM which ensures the system to prevent according to necessary requirements the light from travelling to the other side of the walls 1002.

Referring to FIG. 1, the aeroponic growing system includes a movable platform 1020, with one such movable platform 1020 being typically positioned at least one end of the aeroponic growing apparatus A for trimming, planting, picking and maintenance purposes of the plants, or other, being grown on the articulated wall 1002, as will be described in more details hereinafter. In embodiments where a plurality of aeroponic growing apparatuses A are disposed side by side, a movable platform 1020 may be moved at the end for performing operation on the articulated walls 1002, and may further be moved between ends of aeroponic growing apparatuses A with minimized displacement.

Figure 4:
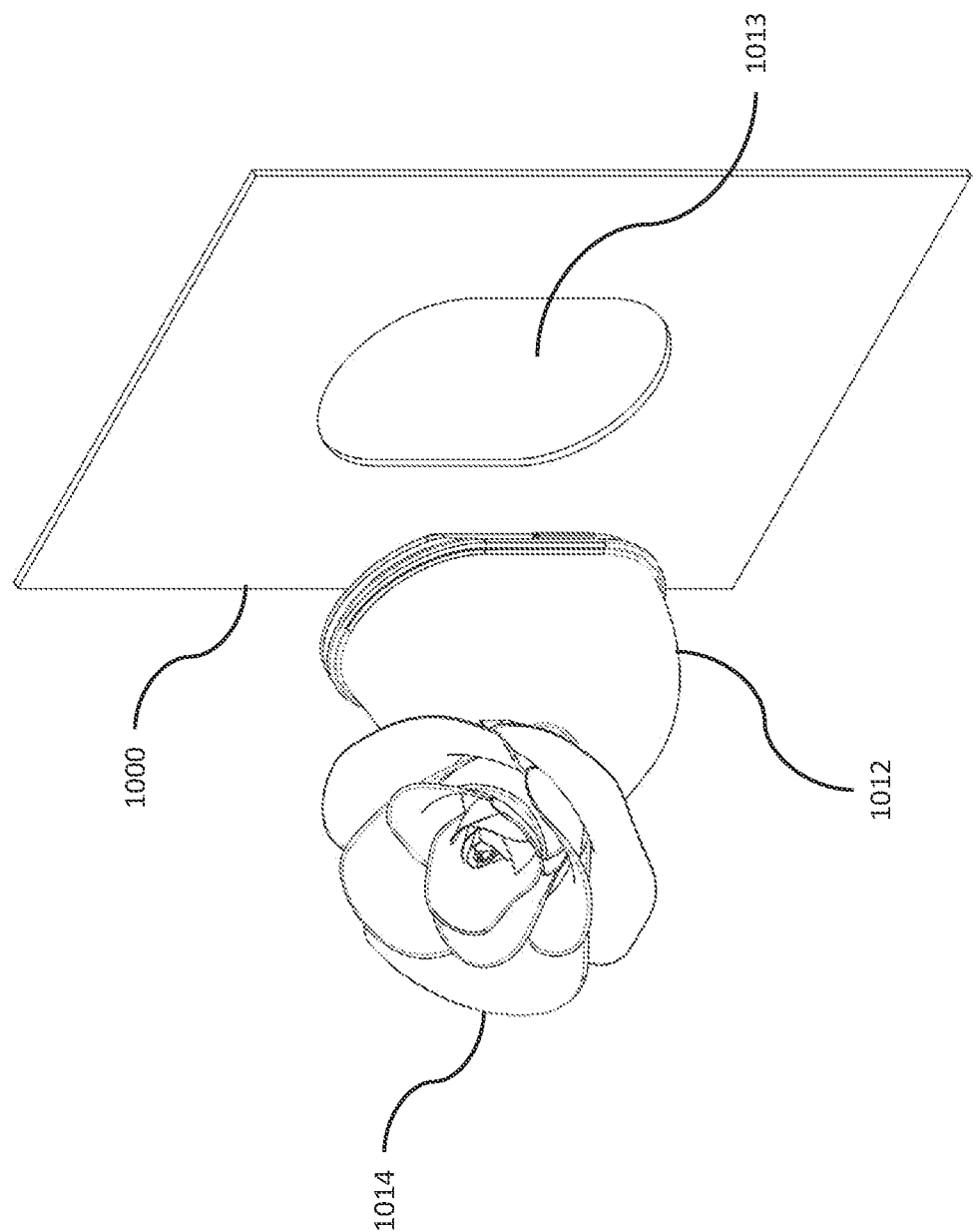
FIG. 4 is an exemplary exploded perspective view of an individual plant-growing container (cup) and of part of a wall of the aeroponic growing apparatus of FIG. 1, in accordance with another exemplary embodiment.

The aeroponic growing apparatus A and, more particularly, the elongated panels 1000 thereof are each provided with a number of inert material cups 1012, which are designed for supporting growing plants 1014, as best seen in FIGS. 2 and 4. Complementary openings 1013 are defined in the elongated panels 1000 such that the cups 1012 are e.g., removably, mounted thereto and to allow the roots of the plants 1014 to extend inwardly of the articulated wall 1002.

According to a realization, the inert material cups 1012 have an oblong base. When the base is mounted to a marrying-shape opening 1013 in an elongated panel 1000, the inert material cups 1012 extend outwards and slightly upward, resulting in nutrients sprayed from the opposed (inner) side of the articulated wall 1002 that are not absorbed by the plant to drip over the inner side rather than travelling to the first (external) side of the articulated wall 1002.

Figure 9:
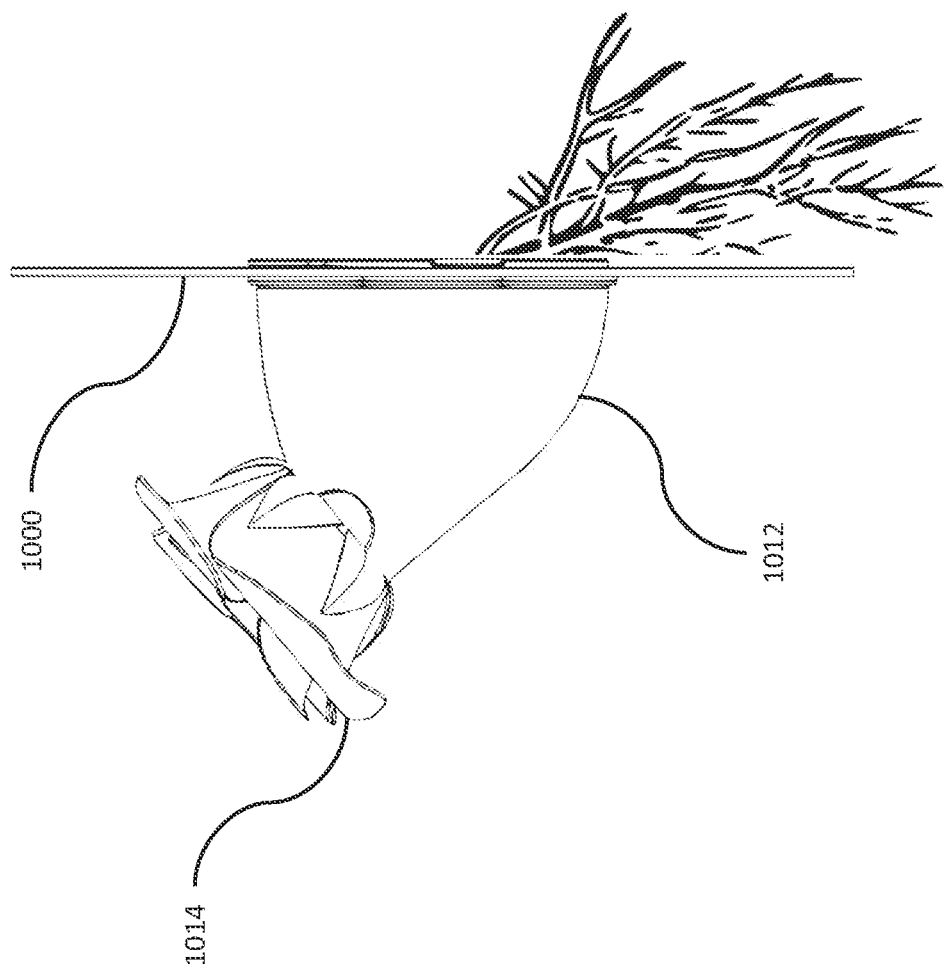
FIG. 9 is a side view of the plant-growing container (cup) of FIG. 4 with a grown plant, wherein the container is mounted to a part of a wall of the aeroponic growing apparatus of FIG. 1.

It is worth noting that the slope of the inert material cups 1012 is designed to obtain a balance between applied gravity over the roots and the normal orientation of the plant toward lighting system 1026 (see FIG. 9), preferably a vertical lighting system 1026 lighting the whole height of one or more panels 1000.

Figure 10:
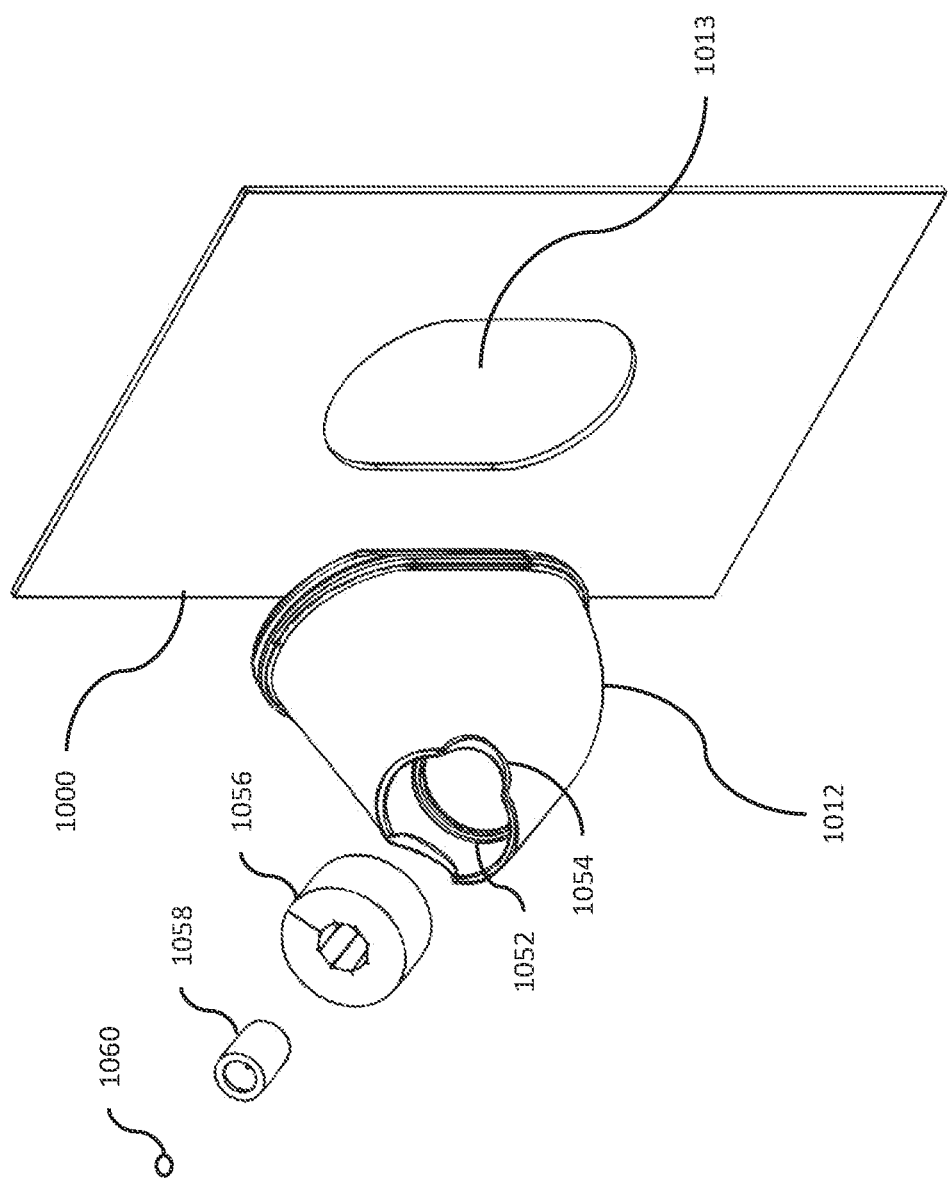
FIGS. 10 and 11 are respectively an exploded perspective view and a side view of an individual plant-growing container (cup) and of part of a wall of the aeroponic growing apparatus of FIG. 1, in accordance with another exemplary embodiment.
Figure 11:
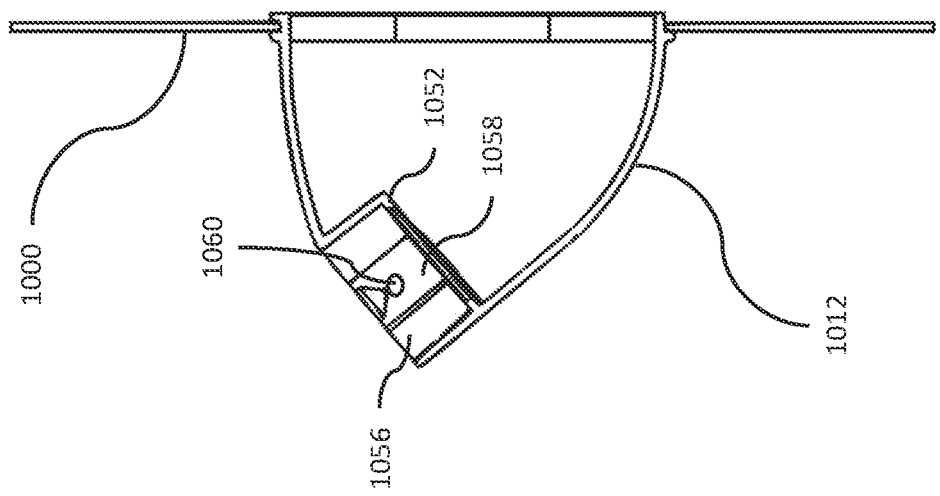

Referring to FIGS. 10 and 11, another realization of the inert material cups 1012 has a cylindrical opening an inwardly extending shoulder 1052. For plant growth, a disk 1056 of, e.g., neoprene is inserted in the cylindrical opening, being prevented to slide beyond by the shoulder 1052. Typically, the seed 1060 is inserted in a rockwool cylinder providing an appropriate environment for the seed to become a fully grown plant, itself inserted in the compressible disk 1056. The inert material cups 1012 feature semi-circular clearances 1054 on both sides providing space to grip the disk 1056, thereby easing maintenance. According to a preferred realization, the cups 1012 are made of opaque material, and are processed to resist to UV light. The compressible disks 1056 are adapted to prevent water and light to travel between the sides of the wall 1002.

It is worth noting that cooperation of the marrying shapes of the base of the cups 1012 and of the openings in the walls 1002 is designed to maintain orientation of the cups 1012 relative to the vertical and to provide watertightness and light insulation between the sides of the walls 1002 like other components of the aeroponic growing apparatus A.

Figure 12:
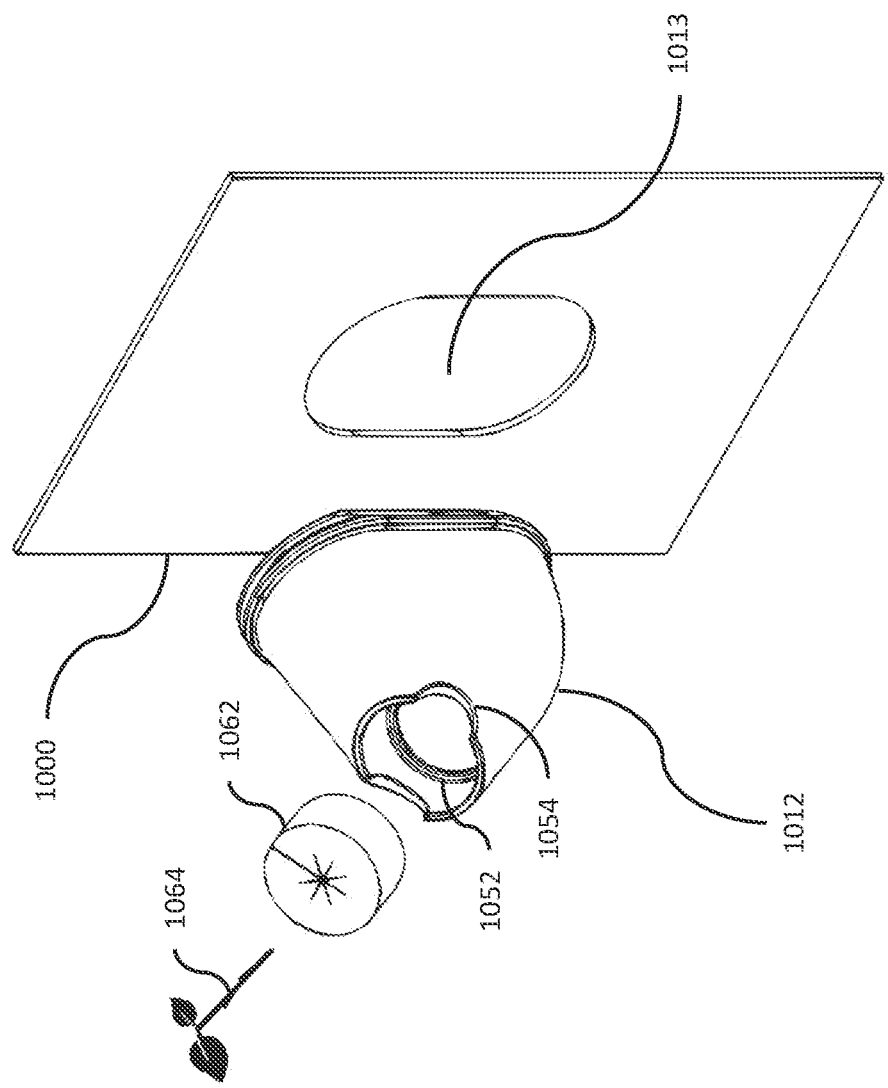
FIGS. 12 and 13 are respectively an exploded perspective view and a side view of an individual plant-growing container (cup) and of part of a wall of the aeroponic growing apparatus of FIG. 1, in accordance with another exemplary embodiment.
Figure 13:
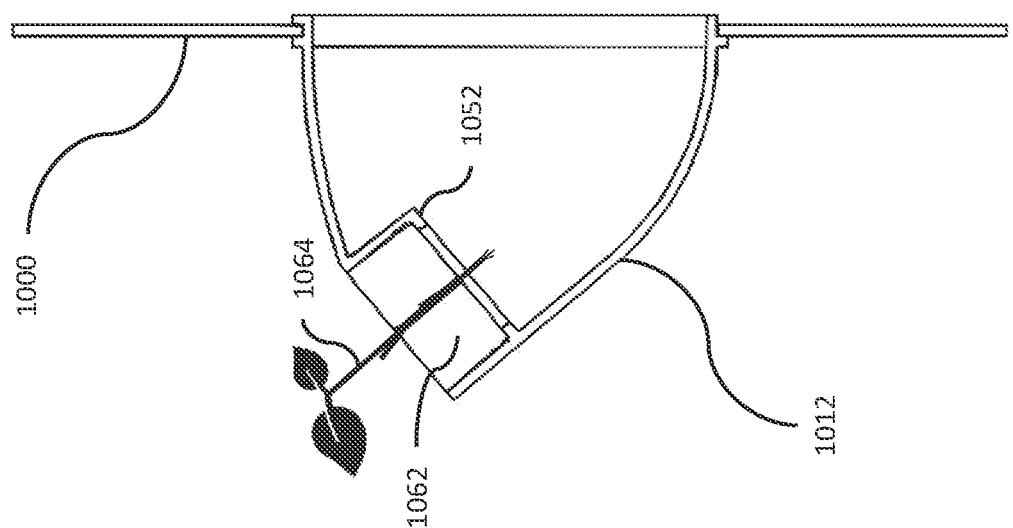

As depicted on FIGS. 12 and 13, other realization may involve other types of compressible disks 1062 adapted to farm plants at other phases than seeds to stem, such as like depicted cuts 1064 planted into the compressible disks 1062 (e.g., for farming of basilic).

Figure 5:
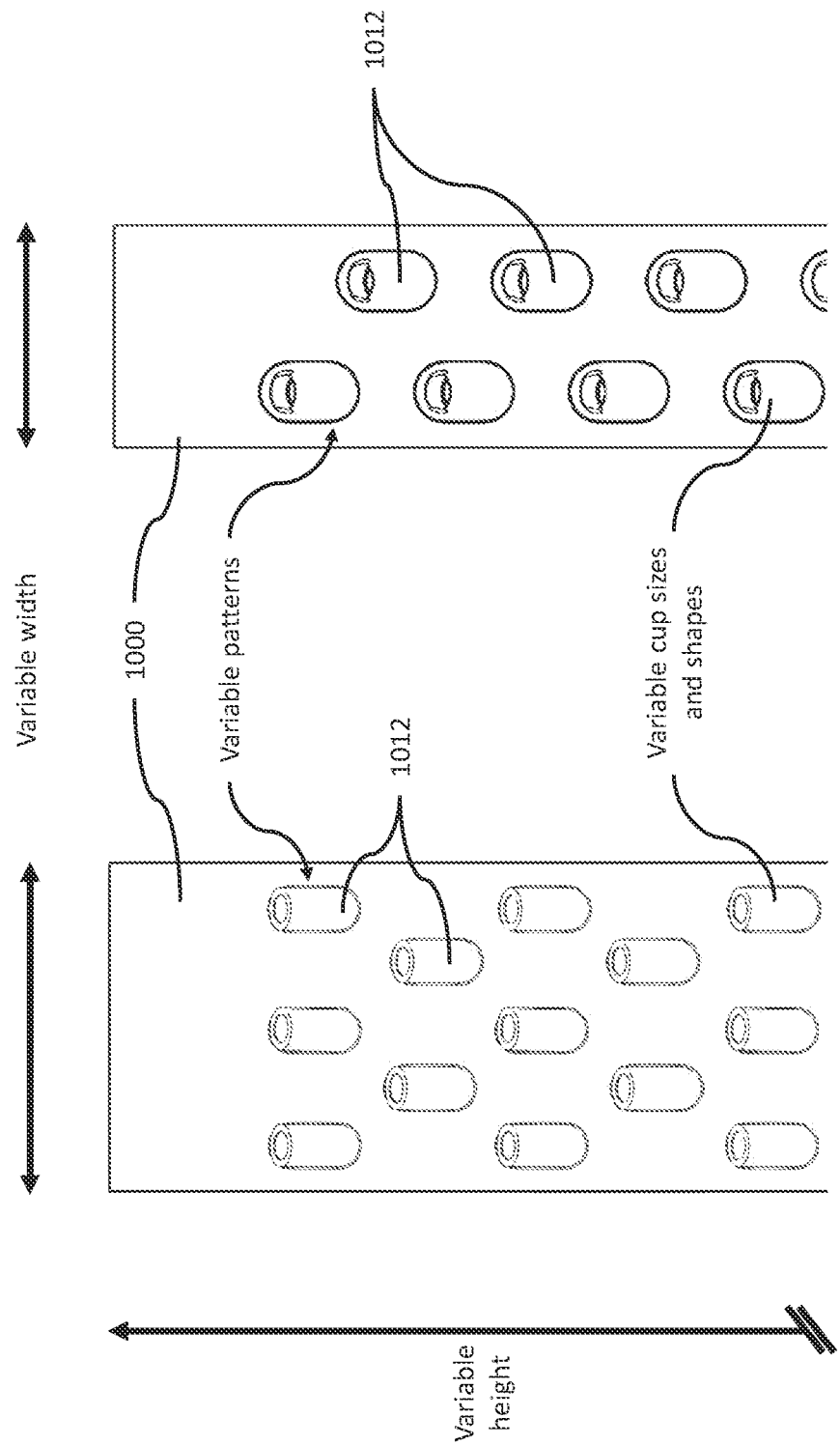
FIG. 5 is an exemplary front elevation view of part of a wall of the aeroponic growing apparatus of FIG. 1 and of a number of plant-growing containers mounted thereto, showing various distribution patterns of the plant-growing containers, in accordance with another exemplary embodiment.

As schematically shown in FIG. 5, the inert material strips or panels 1000 can adopt various sizes (e.g., widths) as well as different patterns for the openings 1013 thereof, for instance to optimize the number of growing cavities in the articulated wall 1002. Furthermore, interchangeable cups 1012 are fixable and can be of variable shapes and sizes to optimize the growing capacity, for example depending on the plants being grown therein.

The articulated wall 1002 is adapted to move horizontally in a closed loop around fixed spraying systems 1025 (see FIG. 3) mounted inwardly of the articulated wall 1002, the spraying systems 1025 being adapted to deliver a nutrient solution to the roots of the plants 1014.

Driving of the articulated walls 1002 provides a solution to limit the side and direction of the fixed spraying systems 1025. It further provides a continuous spraying solution, in other words one minimizing the interruptions of the spraying process and thus avoiding most problems of nozzles clogging with nutrients that would occur with intermittent spraying solutions.

It is worth noting that the spraying systems 1025 is movable toward and away of the articulated wall 1002, wherein controlling pressure and distance allows to control the characteristics of the sprayed droplets of nutrients.

Transversal rails 1050 may be mounted about the top of the aeroponic growing apparatuses A, perpendicular to the longitudinal directions of the carousels, for components to be suspended to the transversal rails 1050. According to a realization, the lighting system 1026 is attached to the transversal rails 1050, allowing to increase or decrease clearance between the lighting system 1026 and the carousel by changing location of attachment of the lighting system 1026 to the transversal rails 1050 at the top. For example, FIG. 8 depicts the capability through displacement of the suspended lighting system 1026 to set its distance to the side of the carousel.

It is to be noted that the nature, quantity, frequency and other characteristics of the spraying are inter-related to the nature of the plants and to the other parameters of the aeroponic growing system S, such as, e.g., the speed the articulated wall 1002 is driven and the characteristics and number of spraying systems 1025 such as the number and distance between the nozzles, and the location and width of the spraying system(s) 1025 within the carousel.

Figure 8:
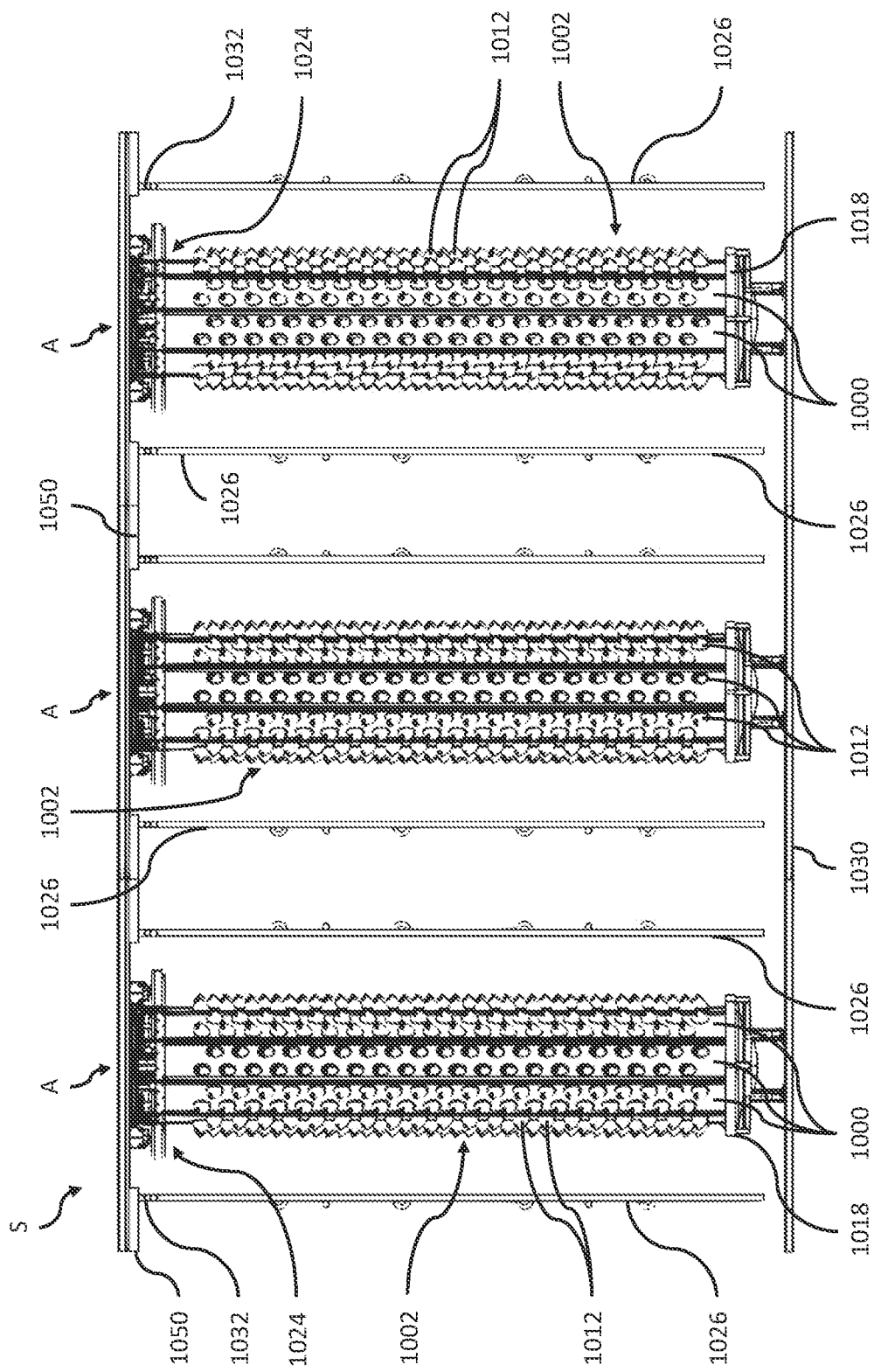
FIG. 8 is a side elevation view of part of the aeroponic growing system of FIG. 6, including end views of three (3) exemplary aeroponic growing apparatuses of FIG. 1, in accordance with another exemplary embodiment.

Referring to FIGS. 6 and 8, a lighting system 1026 is provided exteriorly of each longitudinal side of the articulated wall 1002 for providing better light penetration for the plants 1014.

Referring to FIG. 1, the aeroponic growing apparatus A also includes an outside fixed vertical spraying system 1022, which is adapted to provide a pollination solution to the plants 1014 in need.

Figure 20:
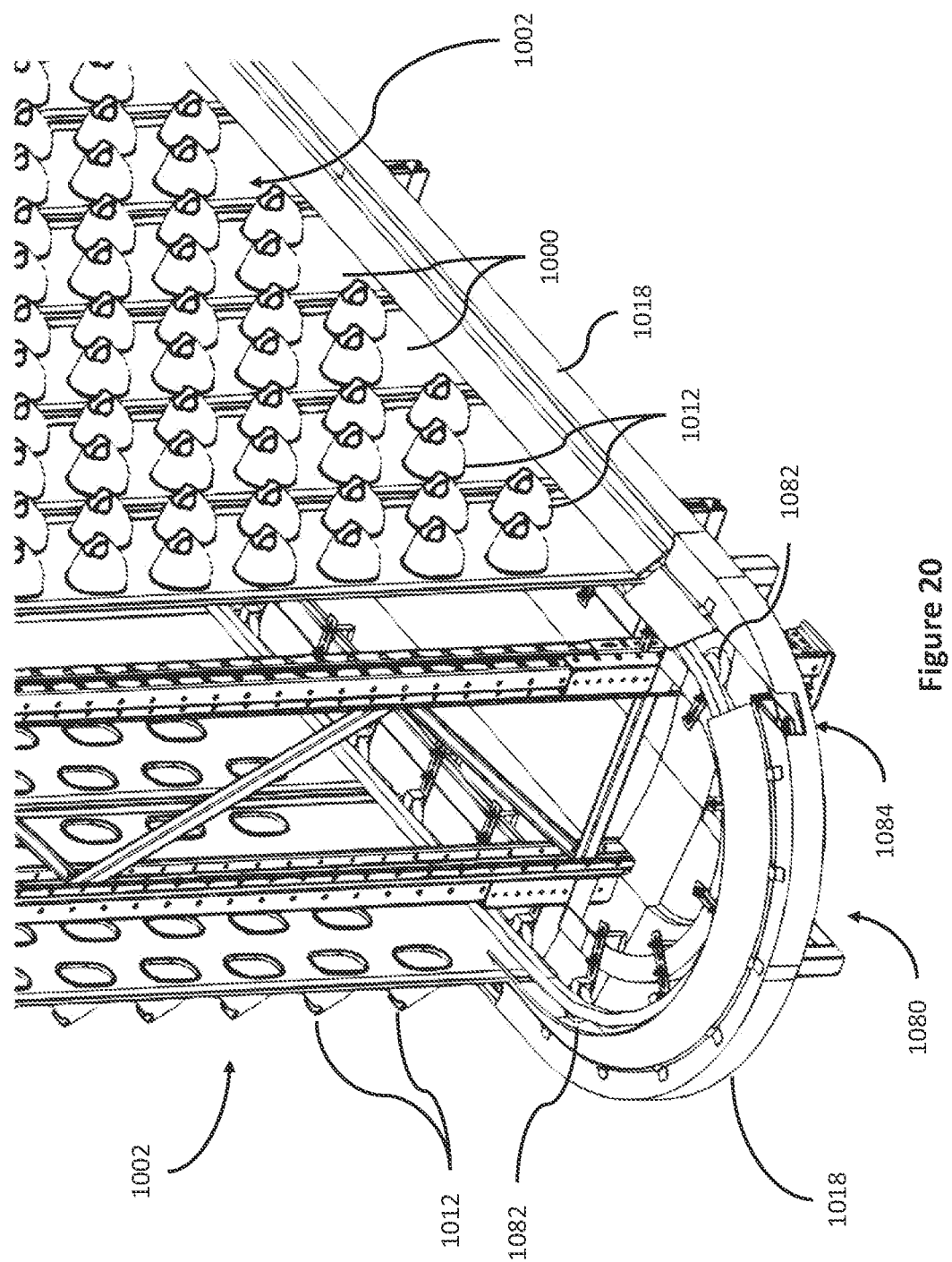
FIG. 20 is a perspective view of the bottom end portion of an aeroponic growing apparatus.

Referring to FIGS. 2, 14 and 20, with inter alia the opaque joints 1010 the covers/shields 1016 and the pan 1018, the aeroponic growing apparatus A provides a dark environment within the moving carousel or articulated wall 1002 where the roots of the plants 1014 can grow without undesirable light penetration.

With the present design, it is possible to manufacture the articulated wall 1002, and thus the aeroponic growing apparatus A, in different heights and lengths and at minimal widths thereby optimizing the floor and room space.

As shown in FIG. 8, the aeroponic growing system S includes an adjustable structural assembly (not identified) that secures the top of the aeroponic growing apparatuses A together to strengthen and stabilise them. The aeroponic growing system S also includes a transversal railing system 1030, which extends perpendicularly to longitudinal axes of the aeroponic growing apparatuses A, so as to enable the structure to be levelled and the distance between the plants 1014 and the lighting systems 1026 to be adjusted, for instance by displacing the aeroponic growing apparatuses A along the railing system 1030 such as to selectively vary the distance between the aeroponic growing apparatuses A. This allows to optimize floor space, room space, growth conditions and to fight the long-term loss of efficiency of the lighting systems 1026.

As also shown in FIGS. 6 and 8, the aeroponic growing system S includes a longitudinal railing system 1032, which extend parallelly to the longitudinal axes of the aeroponic growing apparatuses A, the railing system 1032 serving to hold the lighting systems 1026 and to move the same longitudinally along the aeroponic growing apparatuses A, for instance to adjust the distance between the lighting systems 1026 and to allow for maintenance.

With general reference to FIG. 6, the aeroponic growing system S further includes a service railing system 1006 adapted to disengage the articulated wall 1002 from one of the aeroponic growing apparatuses A. The articulated wall 1002 is disengageable from its aeroponic growing apparatus A and is then displaced on the service railing system 1006 between different rooms or stations, which stations are used, for instance, for reversing the orientation of the wall 1002 through an inverting station, for picking the sufficiently grown plants, sanitizing, planting, dormancy period, and other purposes.

Referring additionally to FIG. 20, a bottom guiding system 1080 comprises wheels 1082 guiding the bottom edge of the articulated wall 1002 in its course and an opening 1084 extending from the straight portion of the pan 1018 parallel to the longitudinal axis of the aeroponic growing apparatus A, wherein the opening 1084 follows the course of the service railing system 1006 on top.

By controlling the direction of displacement of an articulated wall 1002, the aeroponic growing system is adapted to selectively move an articulated wall 1002 to a desired position, e.g., on the desired aeroponic growing apparatus A, to lead an articulated wall 1002 to disengage from an aeroponic growing apparatus A, or for an articulated wall 1002 to be inverted.

As illustrated on FIG. 6, the service railing system 1006 may lead to a workstation 1034.

As depicted on FIG. 6, the working station 1034 comprises shields 1016 and a pan 1018 for recuperating water used during e.g., cleaning of the articulated wall 1002.

The driving system 1024 further comprises one or more additional motorization assemblies, that may comprise e.g., a set of two opposed tires, to drive the articulated walls 1002 when displaced out of around an aeroponic growing apparatus A. It is worth noting that the one or more motorization assemblies 1024 may be installed over the possible path of the articulated walls 1002 to drive the articulated walls 1002 regardless of their actual position in the potential paths as will be discussed in more details hereinafter. It further provides the advantage of centralizing the automation process, limiting the resources requirements.

Figure 7:
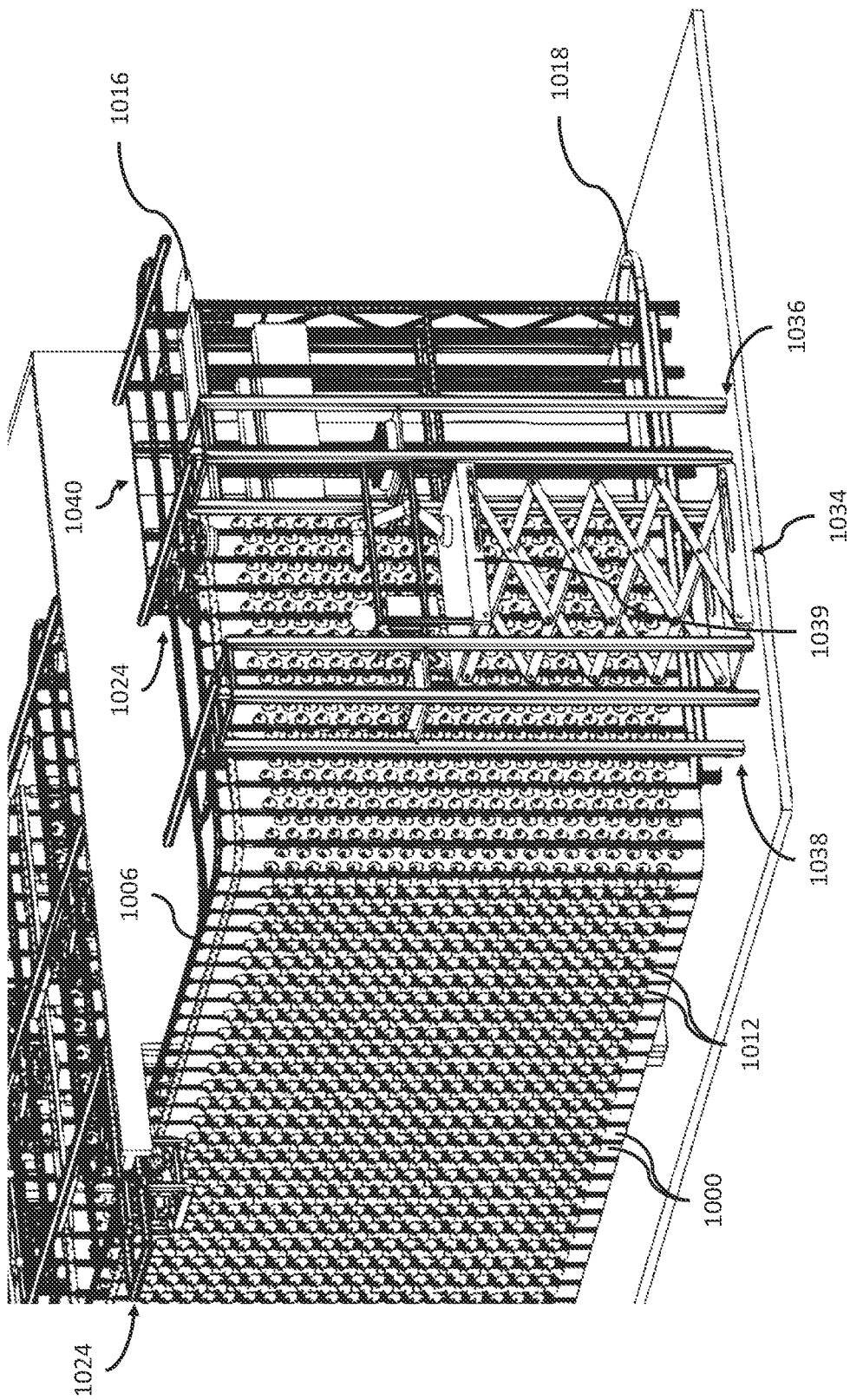
FIG. 7 is a perspective view of part of additional stations of the aeroponic growing system of FIG. 6, in accordance with another exemplary embodiment.

Referring mainly to FIGS. 6 and 7, a central, ergonomic workstation 1034 is provided, which is located remotely from the grow room (where are the aeroponic growing apparatuses A). The workstation 1034 is associated an elevating movable platform 1039 that is used to work on an articulated wall 1002 that is temporarily disassociated from its original aeroponic growing apparatus A, such as to harvest grown plants, trim growing plants, new plantings, etc. The workstation 1034 also reduces manpower, reduces exposure to UV lights and offers an ergonomic working environment.

It is worth noting that the workstation 1034 and the elevating platform 1039 may be operated by an operator, or may in other realization, or for specific operations, be fully automated, wherein e.g., a robotic arm coupled with sensors may perform operations over the articulated walls 1002 according to program codes, or any alternative in-between involving a cooperation of robotic operations and human operations.

The elevating platform 1039 is adapted to be displaced up and down, so as to allow an operator, and/or the robotic arm, to easily reach each section of the articulated wall 1002. The ability to move the articulated wall 1002 backward and forward through the motorization assembly 1024 allows to easily reach each section thereof.

The railing system, comprising the top railings 1004 and the service railings 1006, may allow an articulated wall 1002 located on the workstation 1034, like other aeroponic growing apparatuses A, to be inverted, for e.g., germination phase.

The aeroponic growing system S also provides for a mechanical feeding system 1036 adapted to feed supplies (packaging, sprouts, etc.) to the operator and/or the automated devices operating the workstation 1034. Another mechanical system 1038 is provided to take down supplies (finished products, wastes, etc.) to the floor.

Figure 19:
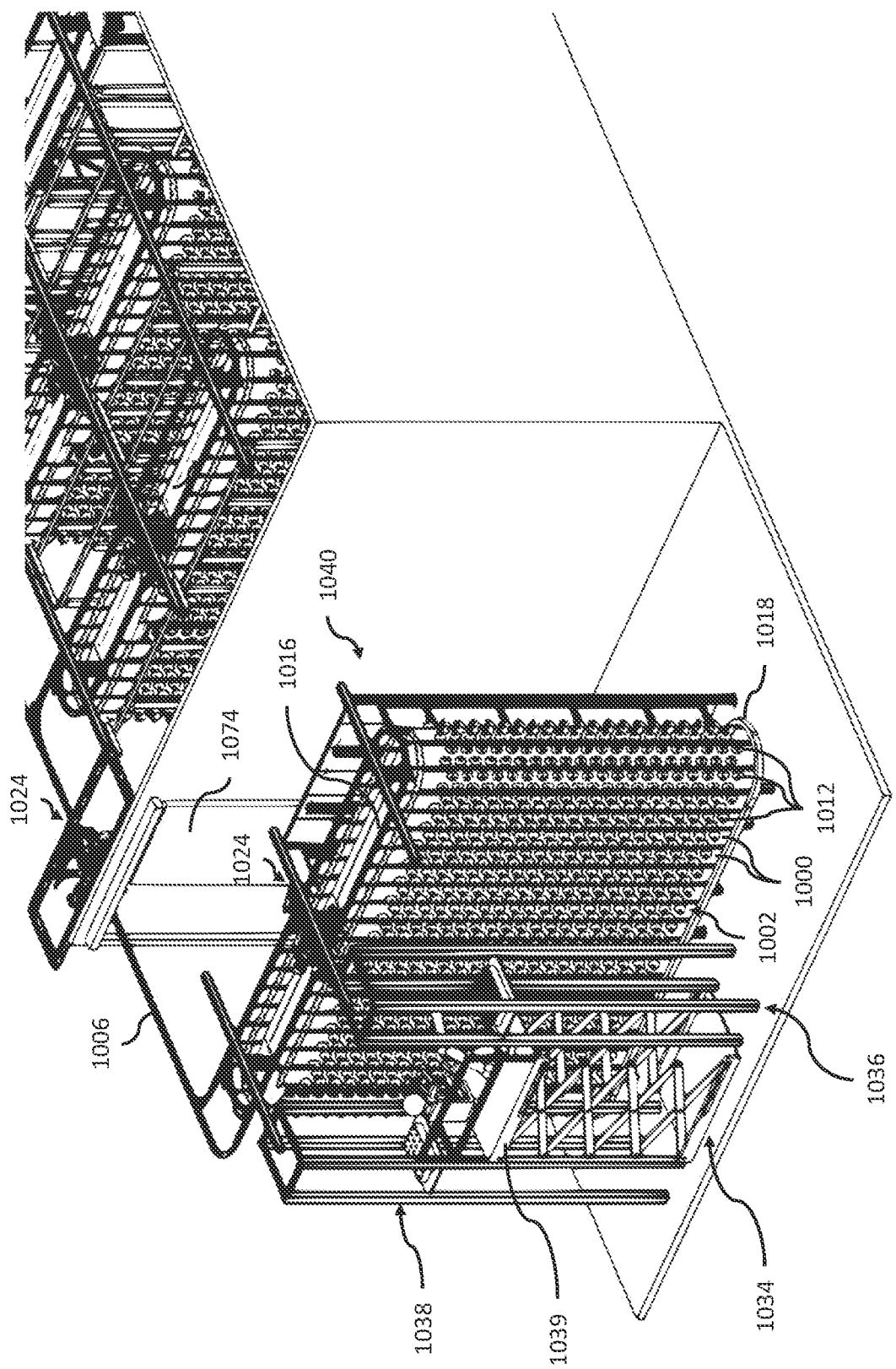
FIG. 19 is a partial perspective view of an aeroponic growing system with the door between the growing area and the workstation open.

Referring to FIGS. 7 and 19, as another station, there is provided a centralized washing system 1040, which is separated from the grow room and is adapted to wash both sides of the articulated wall 1002. The washing system 1040 typically provides an automated system to wash, rinse and sanitize both sides of articulated wall 1002, including for instance moving brushes to clean both sides of the wall 1002. The automated washing system 1040 allows for the wall 1002 to be moved backward and forward for cleaning the wall section by section. Such an automated washing system eliminates the dangers of using labor for this task (heights, lighting systems, etc.).

Figure 23:
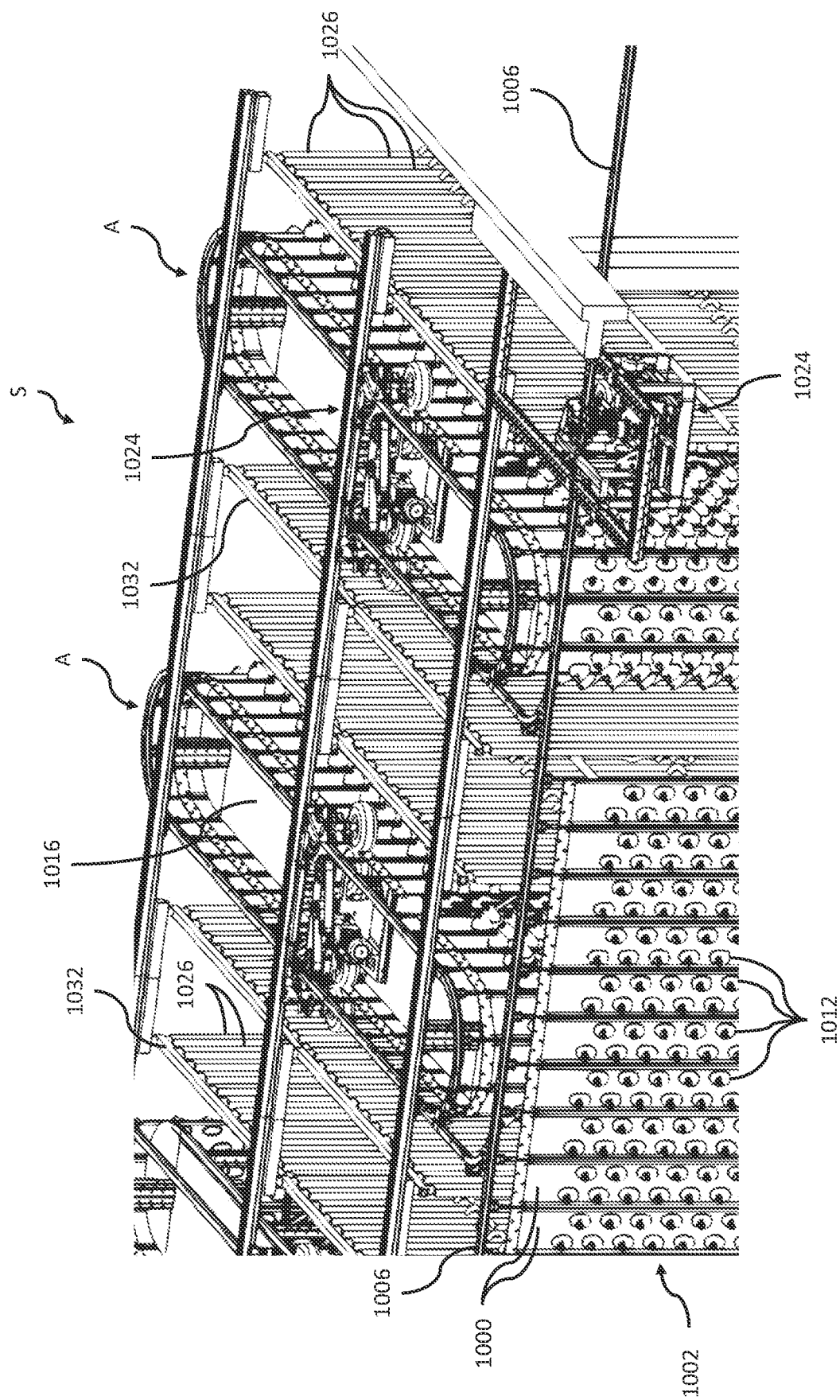
FIG. 23 is an enlarged perspective view of an upper portion of the aeroponic growing apparatus in accordance with an embodiment with a top portion of the wall travelling along the service railing system toward the workstation.
Figure 24A:
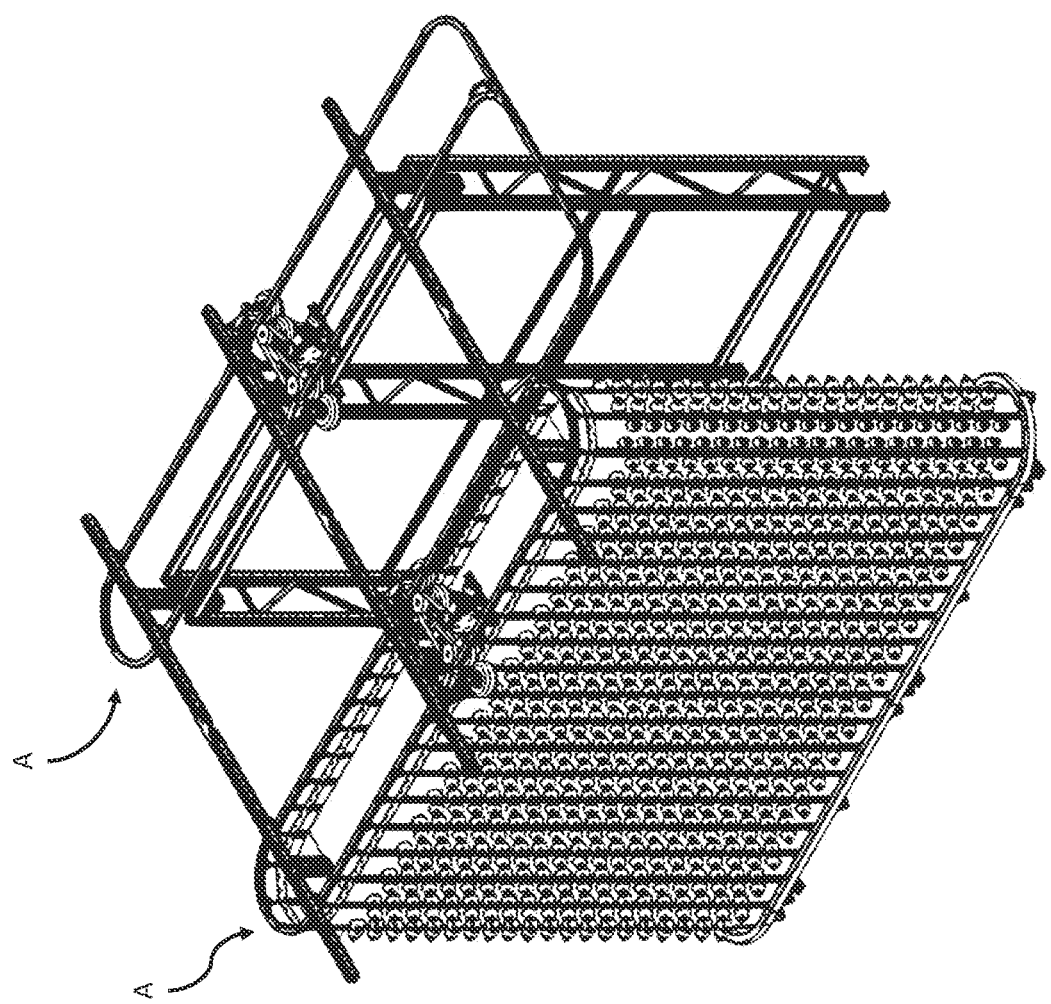
FIGS. 24A to 24F are perspective views depicting traveling states of the wall during a process of inverting the orientation of the elongated panels.
Figure 24B:
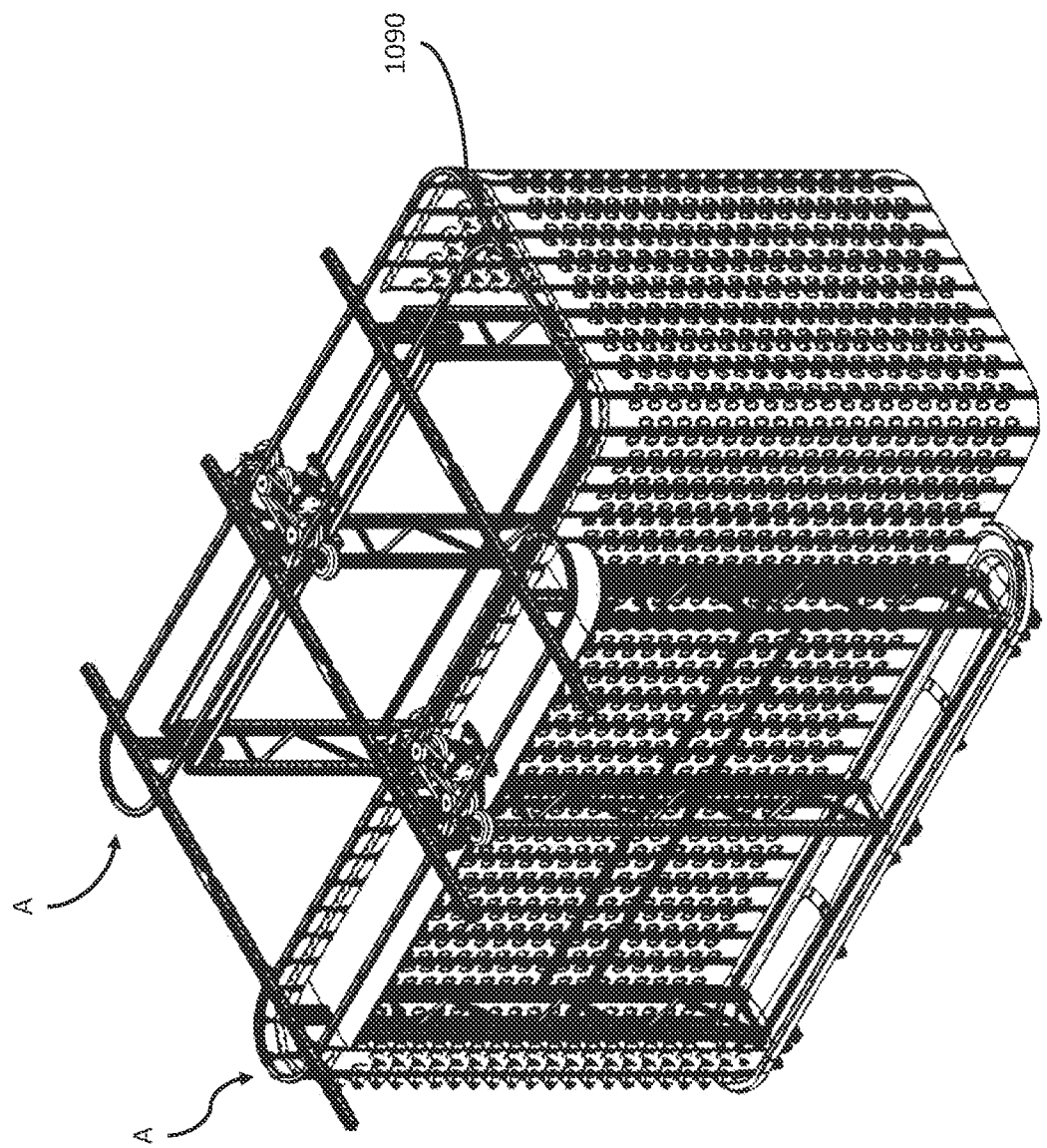
Figure 24C:
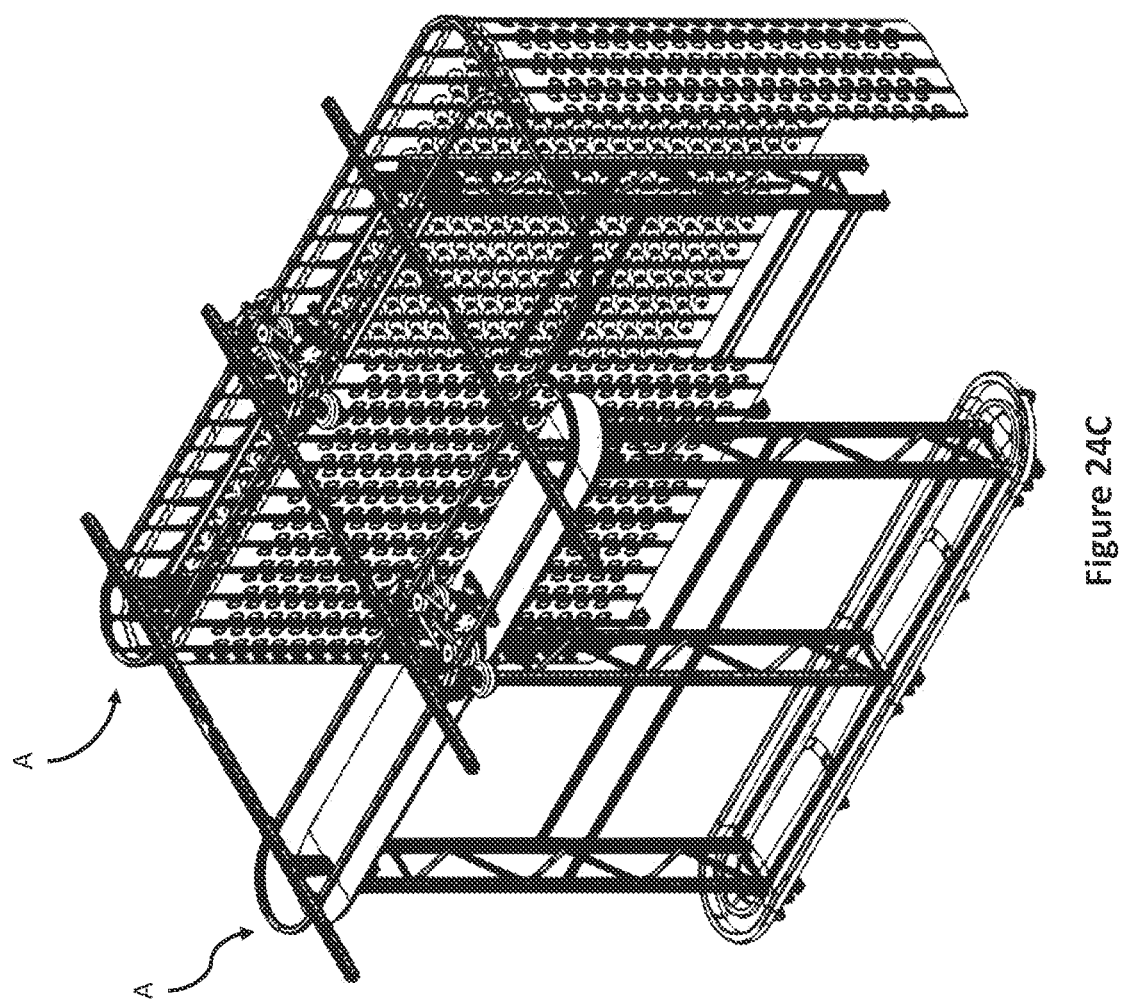
Figure 24D:
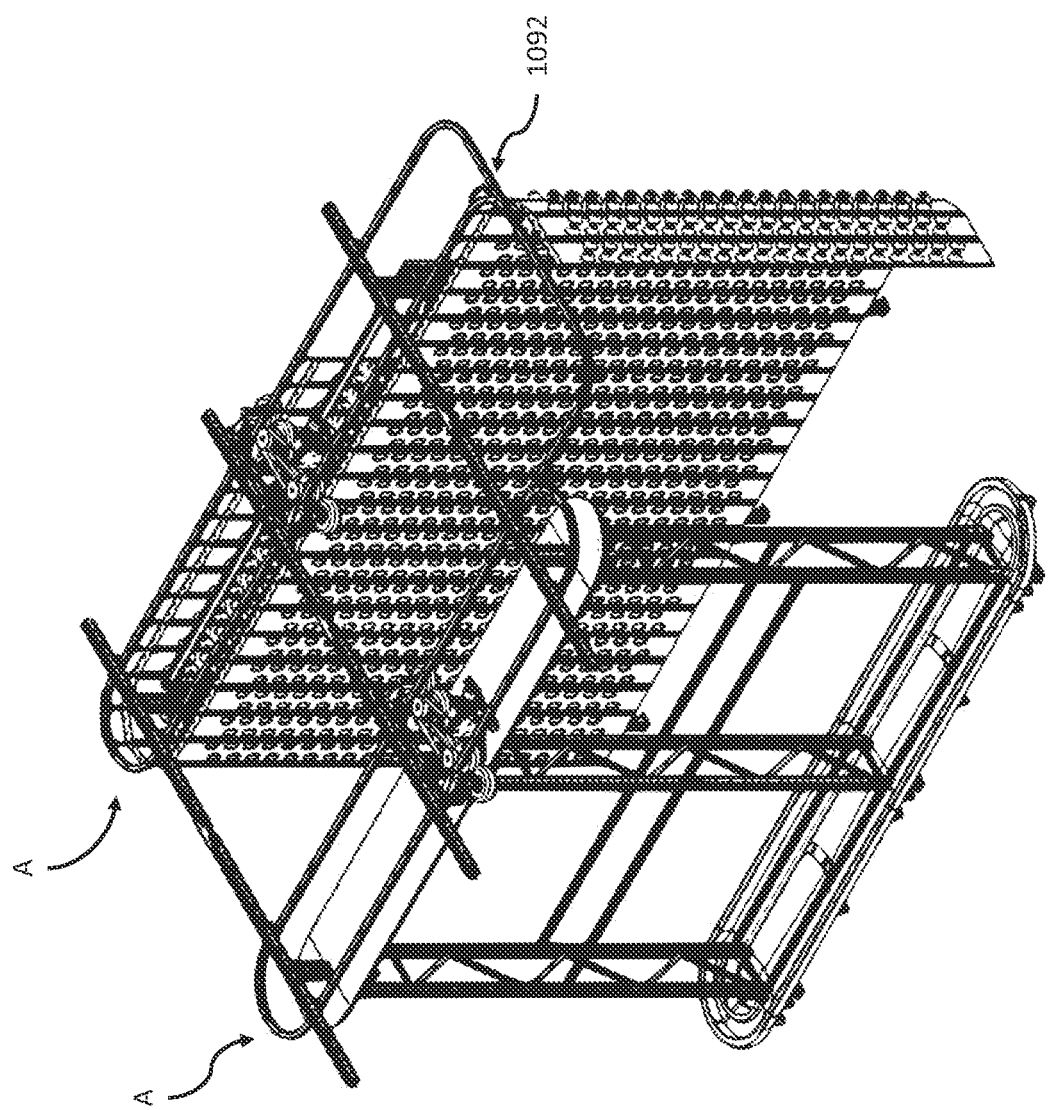
Figure 24E:
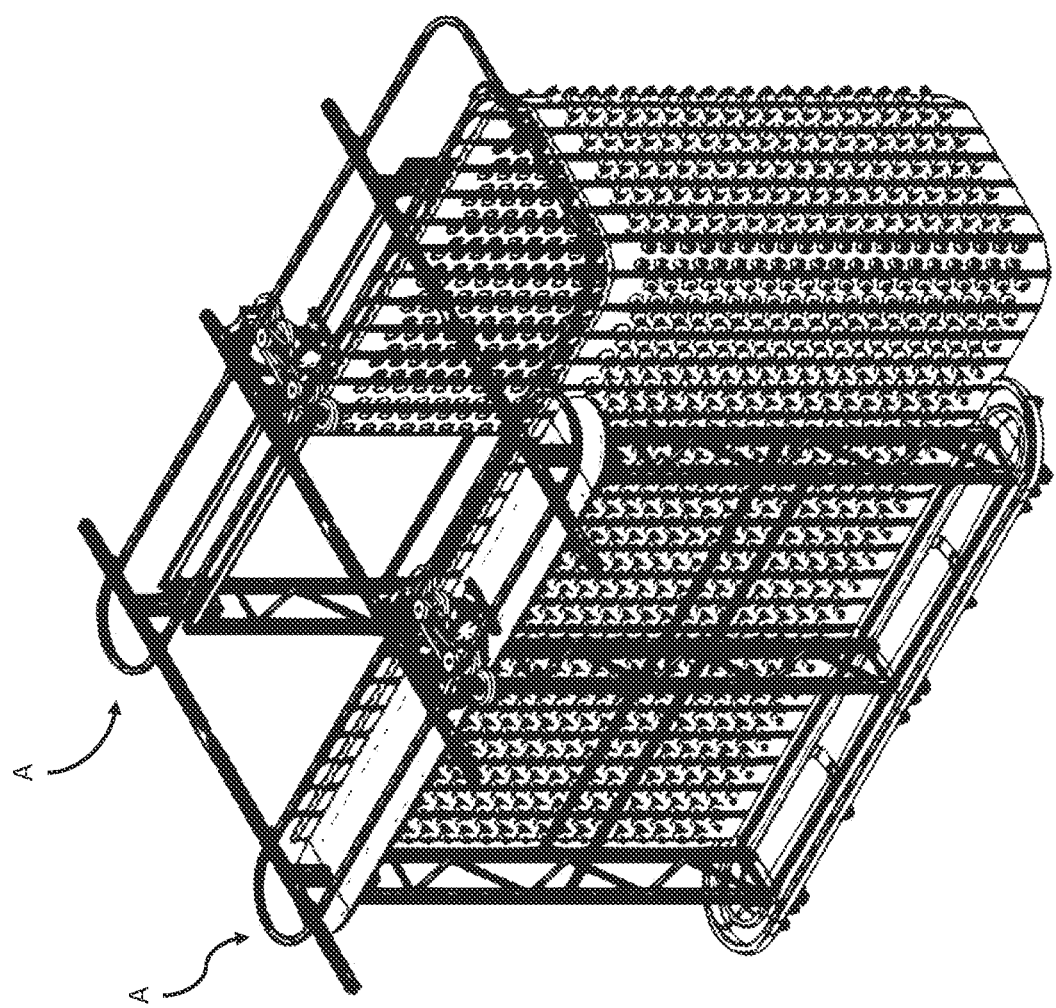
Figure 24F:
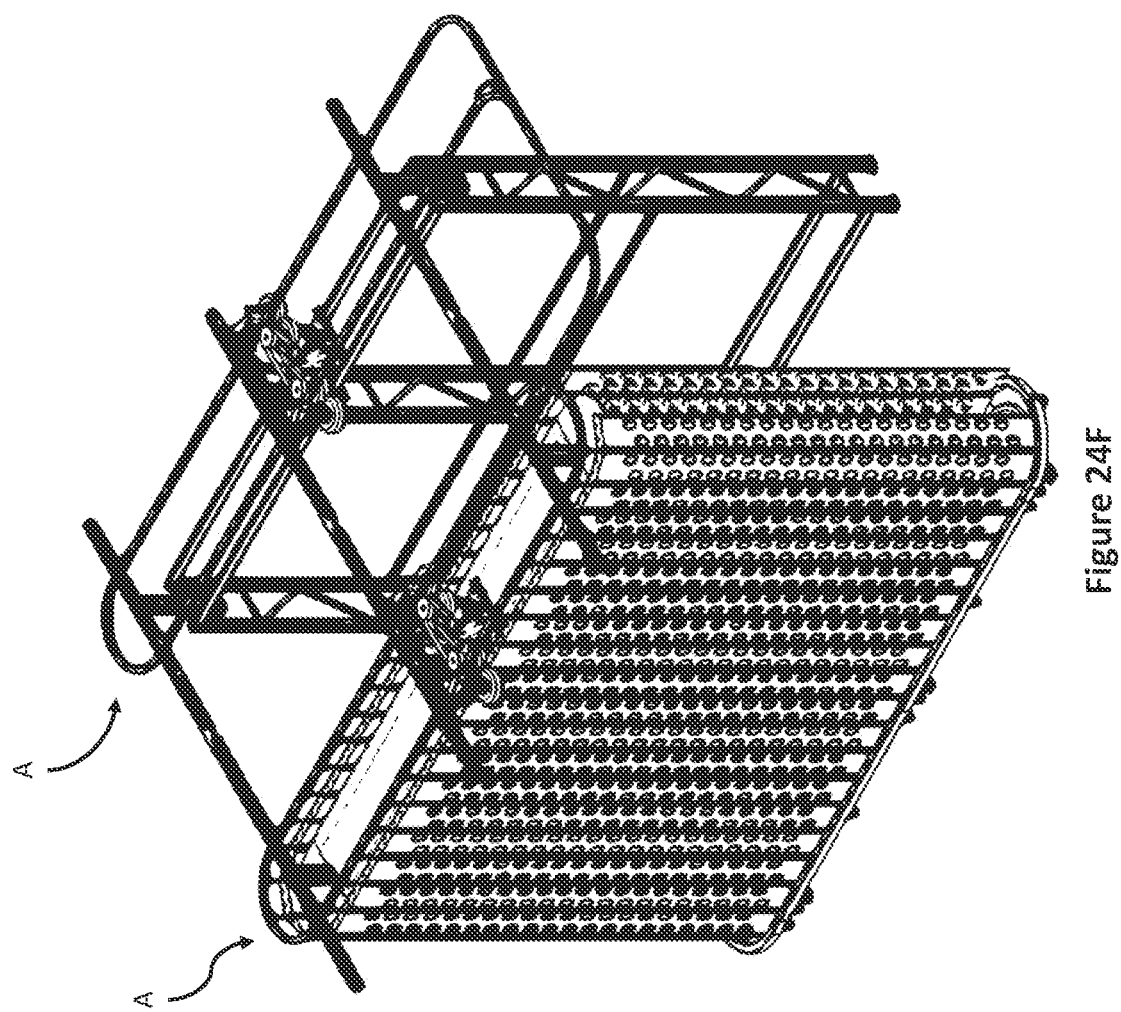
Figure 25:
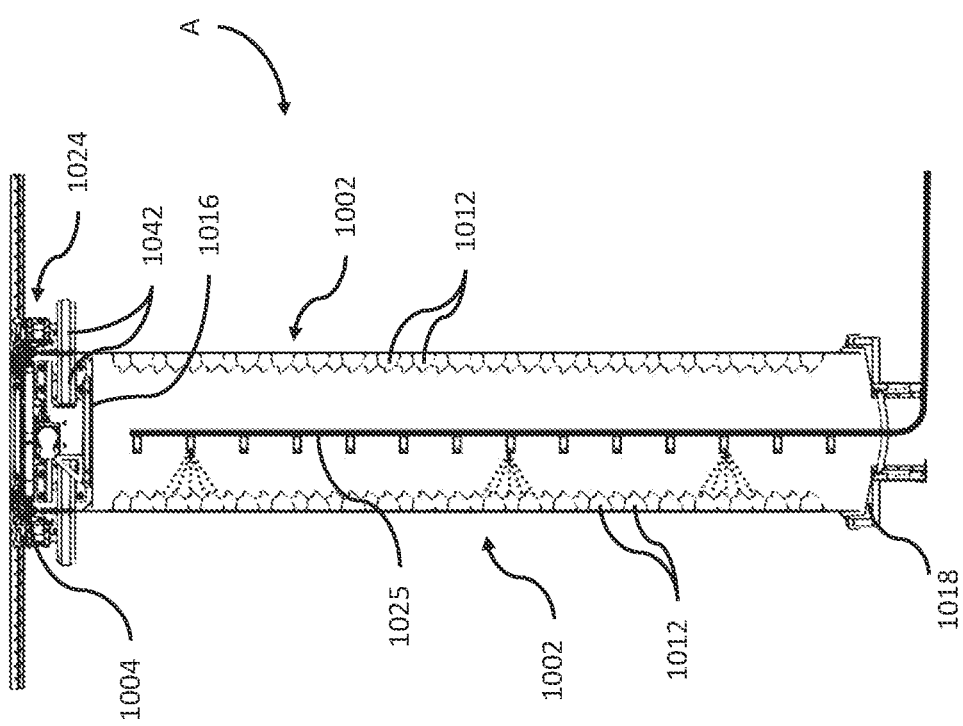
FIG. 25 is a schematic vertical transversal cross section view of the aeroponic growing apparatus of FIG. 1 with the elongated panels inverted through the process depicted through FIGS. 24A to 24F.

Referring to FIGS. 23 to 25, it is shown on FIG. 23 a portion of a wall 1002 travelling along the service railing system toward the workstation 1034, wherein at least some of the elongated panels 1000 have left the carousel configuration. It is further shown through FIGS. 24A to 24F that the configuration of the service railing system 1006 allows to drive a wall 1002 such as inverting the facing side (e.g., from the cups 1012 facing outward to the cups 1012 facing inward). For instance, FIG. 24A shows the wall 1002 as a carousel in its initial configuration, cups 1012 facing outward. FIG. 24B depicts the wall 1002 exiting the first structure and entering the second structure through rails section 1090. Accordingly, the cups 1012 of the panel rotating around the second structure have their cups 1012 facing toward the center of the second structure. FIG. 24C depicts the last elongated panels 1000 being led around the second structure. FIG. 24D depicts the first elongated panels 1000 leaving the area of the second structure through railing section 1092. FIG. 24E depicts the elongated panels 1000 beginning to be suspended to the rails of the first structure with the cups 1012 facing inward. FIG. 24F depicts when all the articulated wall 1002 is back around the first structure, with the cups 1012 facing inward. Accordingly, between FIG. 24A and FIG. 24F, the orientation of the wall 1002 is inverted.

Referring to FIG. 25, it is worth noting that this inverted configuration wherein the cups 1012 are facing inward may be advantageous for some phases of the growth of the plants, e.g., during the germination phase. Furthermore, by having the wall 1002 inverted, it is possible to have increased relative humidity and temperature conditions without having to set it to the whole room. The process of inverting the wall 1002 has further advantages such as avoiding some transplantation phases, adding a solution to control the lighting of the plants e.g., a phase of complete darkness, without them having to be moved to another room/station even when the neighbor carousel is lit, etc. Such advantages and others may be foreseen by a person skilled in the art.

Figure 17:
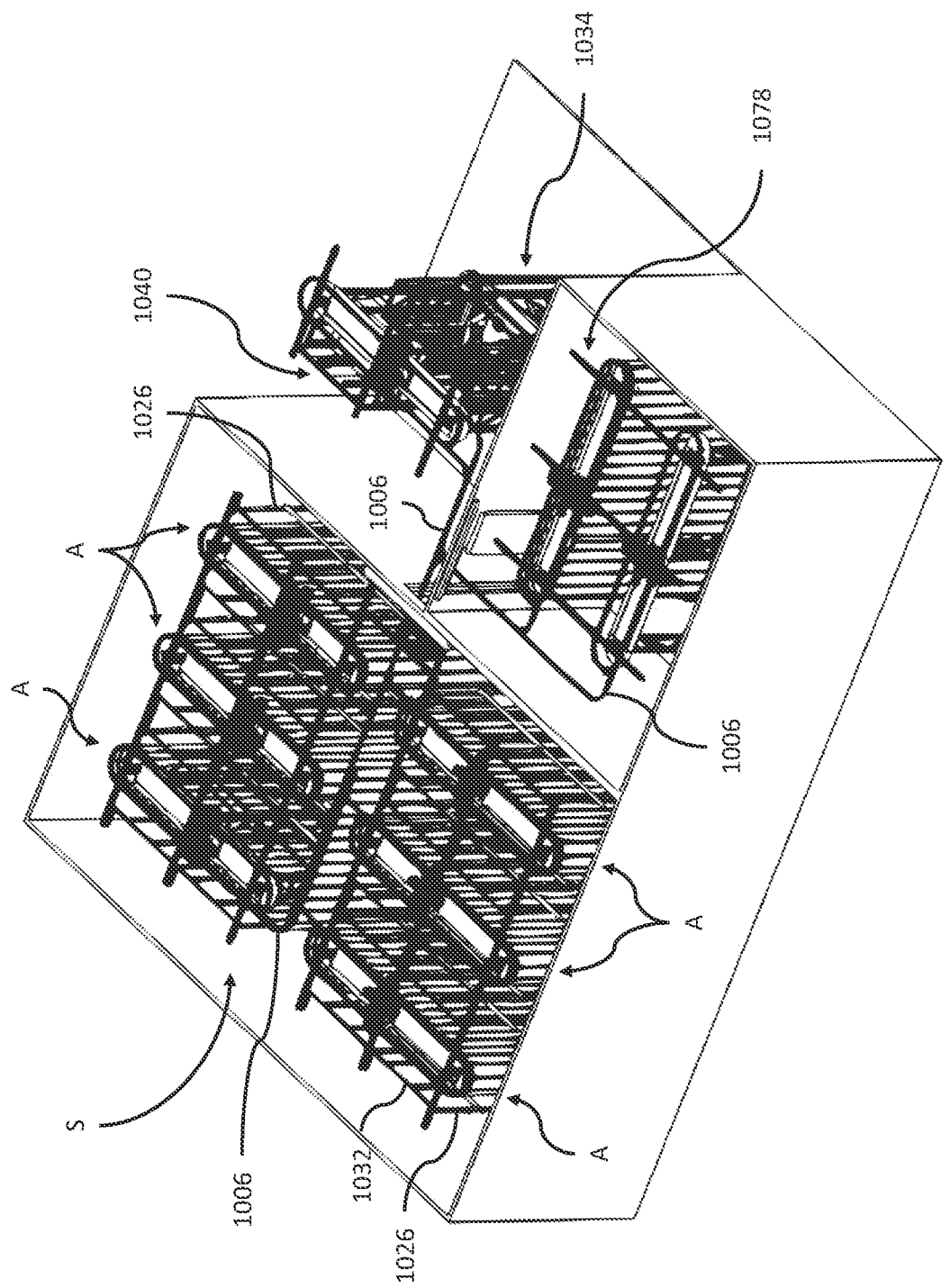
FIGS. 17 and 18 are respectively a perspective view and a floor plan of an aeroponic growing system comprising a plurality of stations designated for distinct phases and/or processes.
Figure 18:
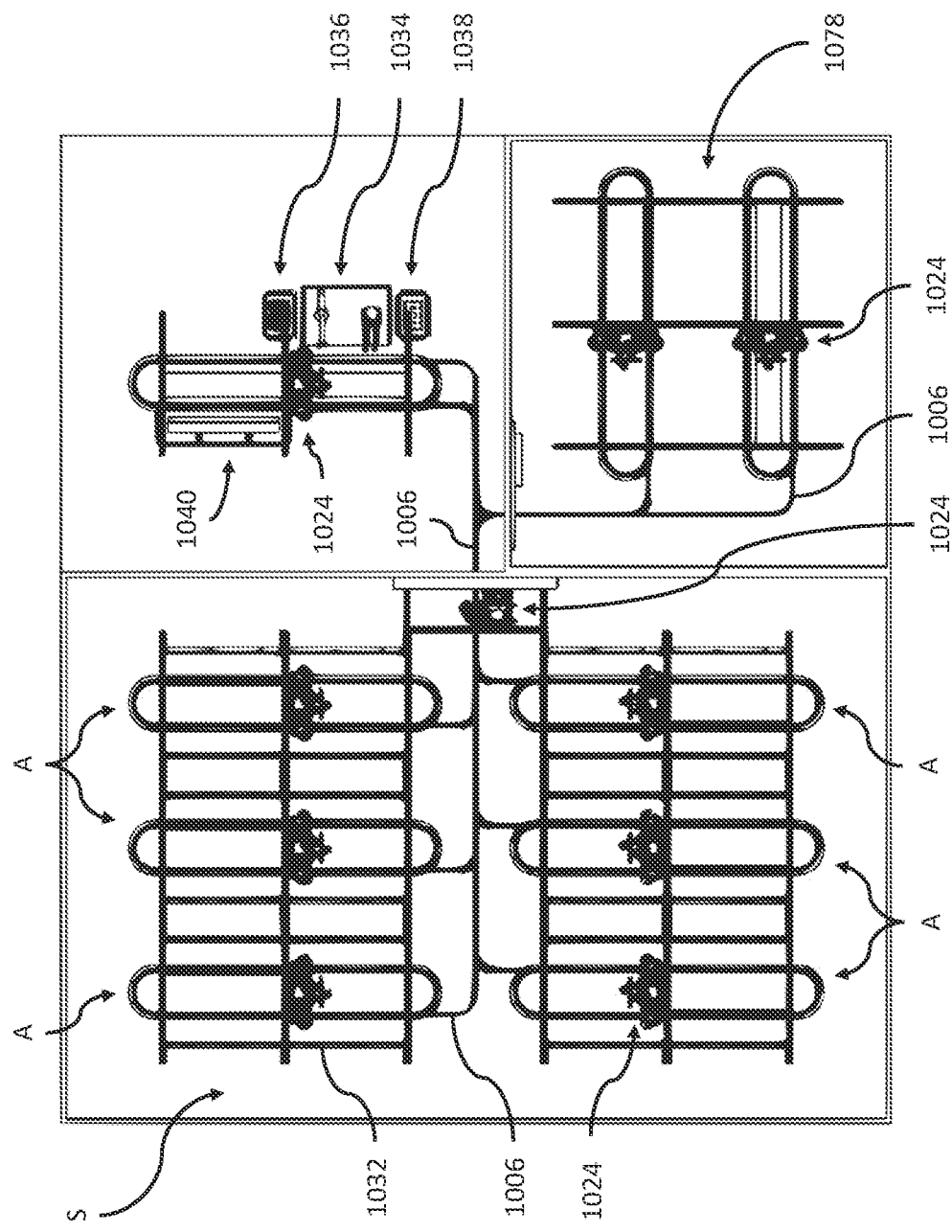

Referring to FIGS. 17 to 19, the aeroponic growing system S may comprise a plurality of stations designated for distinct phases and/or processes, wherein the stations may be in closable spaces connected by the service railing system 1006. For instance, the service railing system 1006 may allow to drive articulated walls 1002 between the growing area and the workstation 1034, and further a dormancy area 1078 divided by a closable door 1074, wherein the plants may be put into, e.g., a dormancy period free of light and may be returned to the growing area when the dormancy period is done. According to requirements, the e.g., dormancy area 1078 may offer one or more characteristics (e.g., temperature, relative humidity, lighting, feeding of nutrients and fertilizers, etc.) that may differ from the growing area.

According to a realization, closable doors 1074 allow to close all the areas, therefore limiting or preventing processing or environmental control in one area to negatively affect the plants located in another area and avoiding necessity of lighting system(s) 1026 in a dormancy room.

According to a realization, the dormancy area 1078 Is adapted to house a plurality of articulated walls 1002, wherein the articulated walls 1002 are designed to be stored as carousels, with each of the articulated walls 1002 being available to be driven out of the dormancy area 1078 independently from the other(s).

The aeroponic growing system S further includes various sensors and software. For instance, sensors are provided to monitor critical parameters. A software monitors and analyses critical information and suggests or acts with regards to the results. The aeroponic growing system S is adapted to measure, analyse, and automatically adjust parameters according to the plant requirements (e.g., light cycle, nutrient preparation, nutrient spraying, quantity of $CO_2$, temperature control, relative humidity control, watering, driving speed and direction of carousels, energy consumption, generation of alarms, generation of reports, etc.). Software is also provided to control all the displacements of any articulated walls 1002 along the railing system, including for controlling the displacement of the articulated walls 1002 for reversing, picking/harvesting, trimming, planting, washing and other purposes. Software also keeps a log wherein is kept track of all information used and/or monitored during the growing process to ensure a traceability.

According to another perspective, the aeroponic growing system S comprises a plurality of aeroponic growing apparatuses A adapted for walls 1002 to be driven as carousels. The aeroponic growing apparatuses A are divided between areas and interconnected through a railing system comprising the top railings 1004 and the service railing system 1006, and a plurality of motorization assemblies 1024 adapted to drive the articulated walls 1002 suspended to the railing system as carousels suspended to the top railings 1004 and as unwrapped articulated walls 1002 suspended to the service railing system 1006 between the aeroponic growing apparatuses A, and/or to invert the articulated walls 1002.

Stations or areas may take many functions, comprising for example a planting station, a growing station, a germination station, a harvesting station, a dormancy station and a cleaning station, inter alia.

Walls 1002 are interconnected with flexible and opaque joints 1010, and the solution uses components and/or solutions on top and bottom adapted to prevent water and light to travel from one side of the articulated walls 1002 to the other side when configured as a carousel.

The aeroponic growing system S comprises spraying systems 1025 and lighting systems 1026 to provide nutrients and light to plants growing on the walls 1002, with the aeroponic growing apparatuses A comprising a pan 1018 at the bottom to recover unabsorbed nutrients. The aeroponic growing apparatuses A also comprises guiding means at the bottom to guide displacement of the elongated panels 1000.

The aeroponic growing system S may comprise structure adapted to customize operation parameters, such as distance between the nozzles of the spraying systems 1025 and a wall 1002.

The elongated panels 1000 are adapted with cups 1012 and other growing means to attach seeds or plants to the aeroponic growing apparatus A and promote growth.

Furthermore, the aeroponic growing system S comprises environmental control components as explained in relation with the following figures.

Figure 26:
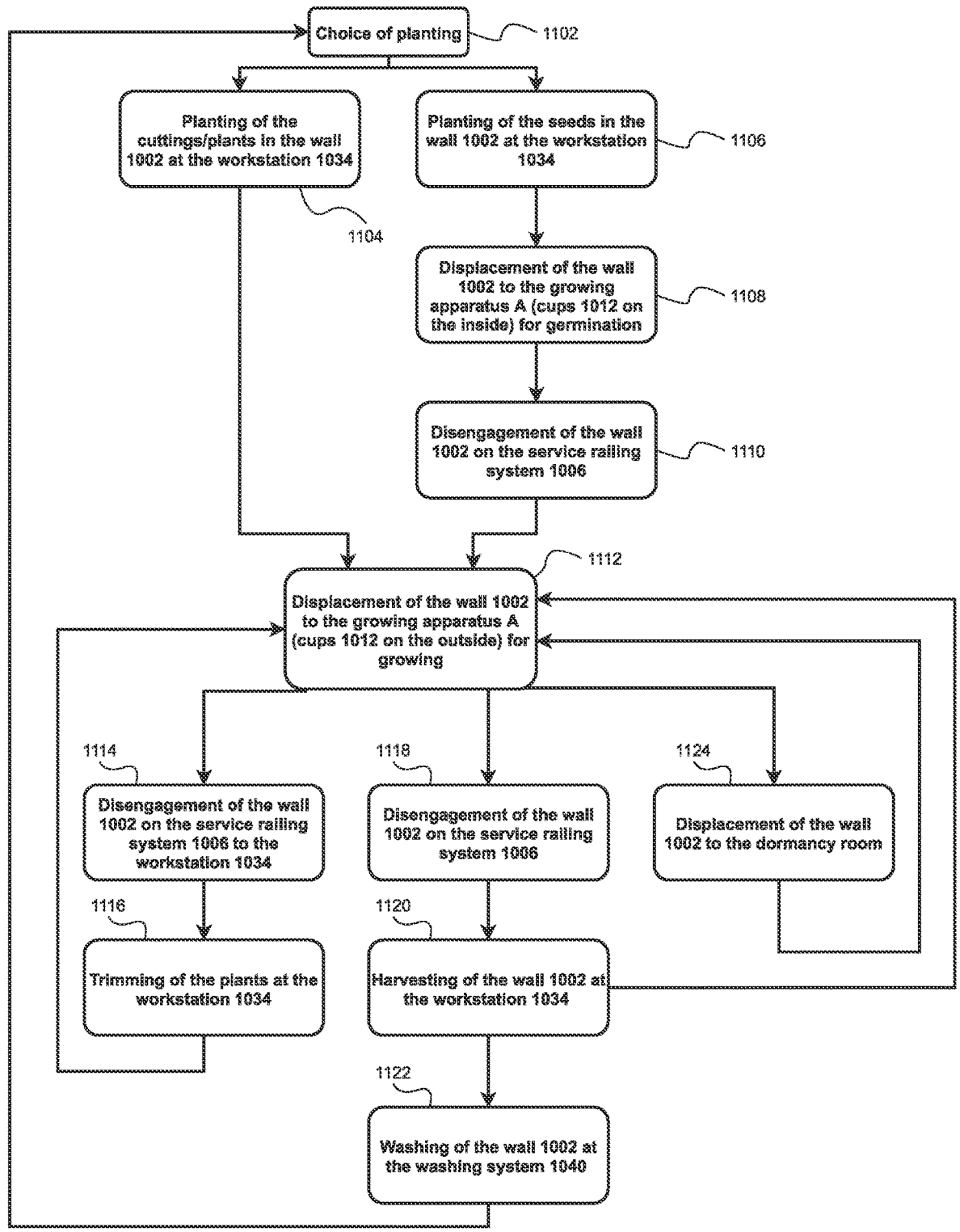
FIG. 26 is a flow chart illustrating steps involved in growing plants using an embodiment of the aeroponic growing system.

Referring now to FIG. 26, a flow chart illustrates steps involved in growing plants. Step 1102 consists in choosing the nature of the planting. Step 1104 consists in planting cuts or young plants in the elongated panels 1000, Alternatively, step 1106 consists in planting seeds, followed with step 1108 wherein the wall 1002 are displaced/inverted for a germination period, and step 1010 wherein wall 1002 are displaced/inverted once again after the germination period. Step 1112 consists in displacing the wall 1002 to a growing station where light and nutrients may be provided to the plants. During the growing period, step 1114 of displacing the walls 1002 to the workstation and step 1116 of trimming the plants may take place numerous times, followed with step 1112 consisting in displacing the wall 1002 to the growing station. During the growing period, step 1124 of displacing the wall 1002 to a dormancy room 1078 may take place, followed with the wall 1002 being returned to the growing station at step 1112. Final steps include to displace the wall to workstation 1034 at step 1118, and harvesting the plants on the wall 1002 at step 1120, followed with either a return to the growing station (step 1112) or step 1122 consisting in washing the wall 1102, after which the wall 1002 may be displaced back to the growing station (step 1112).

Figure 27:
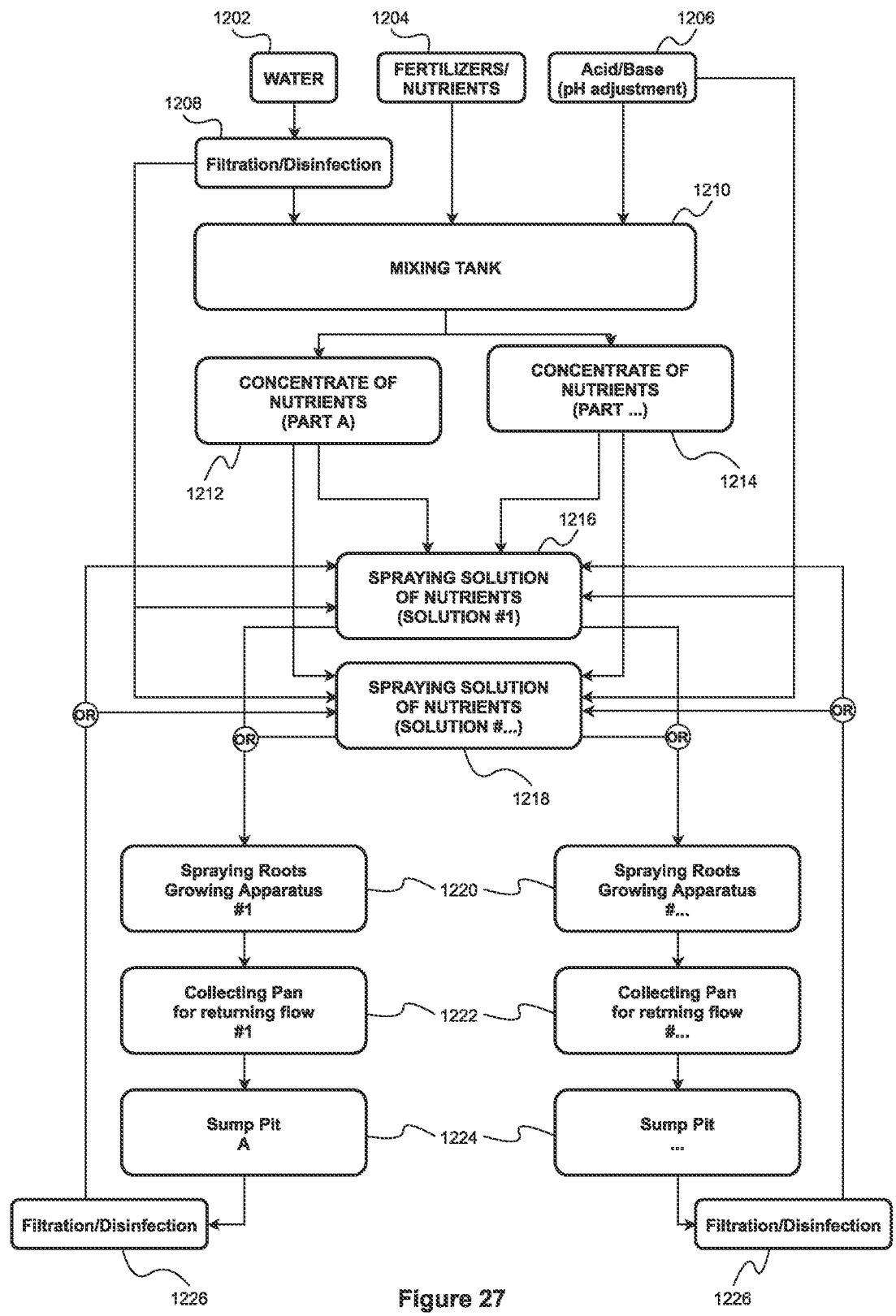
FIG. 27 is a block diagram illustrating components involved in a mixing room adapted to mix fertilizers and nutrients.

Referring to FIG. 27, a block diagram schematically illustrates reservoir(s) of water 1202, reservoir(s) of fertilizers and nutrients 1204 and reservoir(s) of acid/base product 1206 used for pH adjustments are provided. A filtration/disinfection station 1208 is used to process water, and these products are mixed in a mixing tank 1210 to obtain a desired mix. These products are fed to reservoirs and controls (e.g., 1212 and 1214), and are fed to the fixed spraying systems 1025 as a spraying solution to be used to feed the plants (e.g., 1216 and 1218). The spraying solution is fed to spray nozzles, e.g., spraying roots growing apparatus 1220 of one or more walls 1002, with the spraying solution not absorbed being collected through the collecting pan assembly 1222, pumped from sump pit 1224, and filtered and/or disinfected 1226 before being returned into e.g., the reservoirs 1216/1218.

Figure 28:
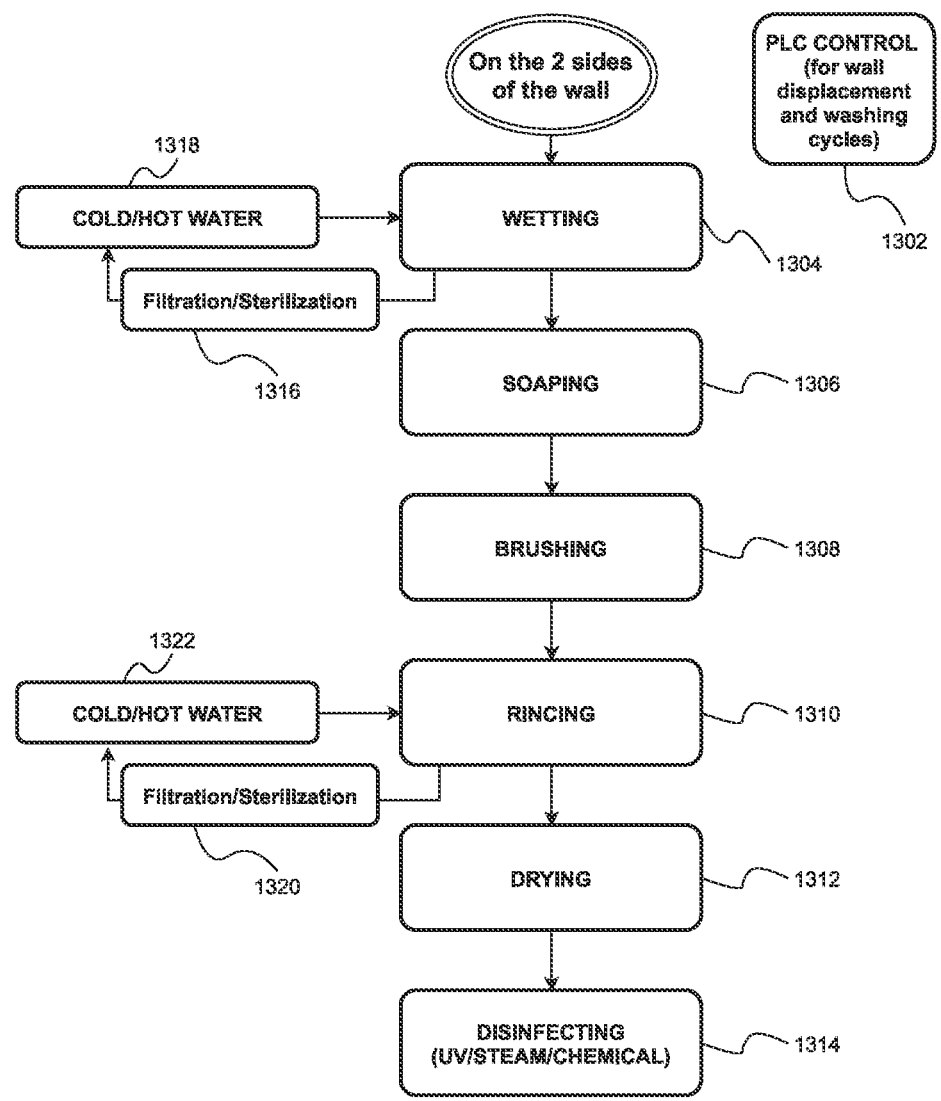
FIG. 28 is a flow chart illustrating steps involved in a washing system adapted to wash components of the aeroponic growing system.

Referring to FIG. 28, process of washing the panels 1000 comprises, for the two sides of the panels 1000, wetting (step 1304), soaping (step 1306), brushing (step 1308), rinsing (step 1310), drying (step 1312), and disinfecting (step 1314) the panels 1000 using UV light, steam and/or chemicals. For the wetting (step 1304) and the rinsing (step 1310), the process comprises the control of temperature and pressure of water (step 1318/1322) and the filtration and/or disinfection of water (step 1316/1320) recovered from the steps of wetting (step 1304) and rinsing (step 1310). A Programmable Logic Controller 1302 (PLC 1302) controls the displacement of the panels 1000 and processes performed through the steps listed before when automated.

Figure 29:
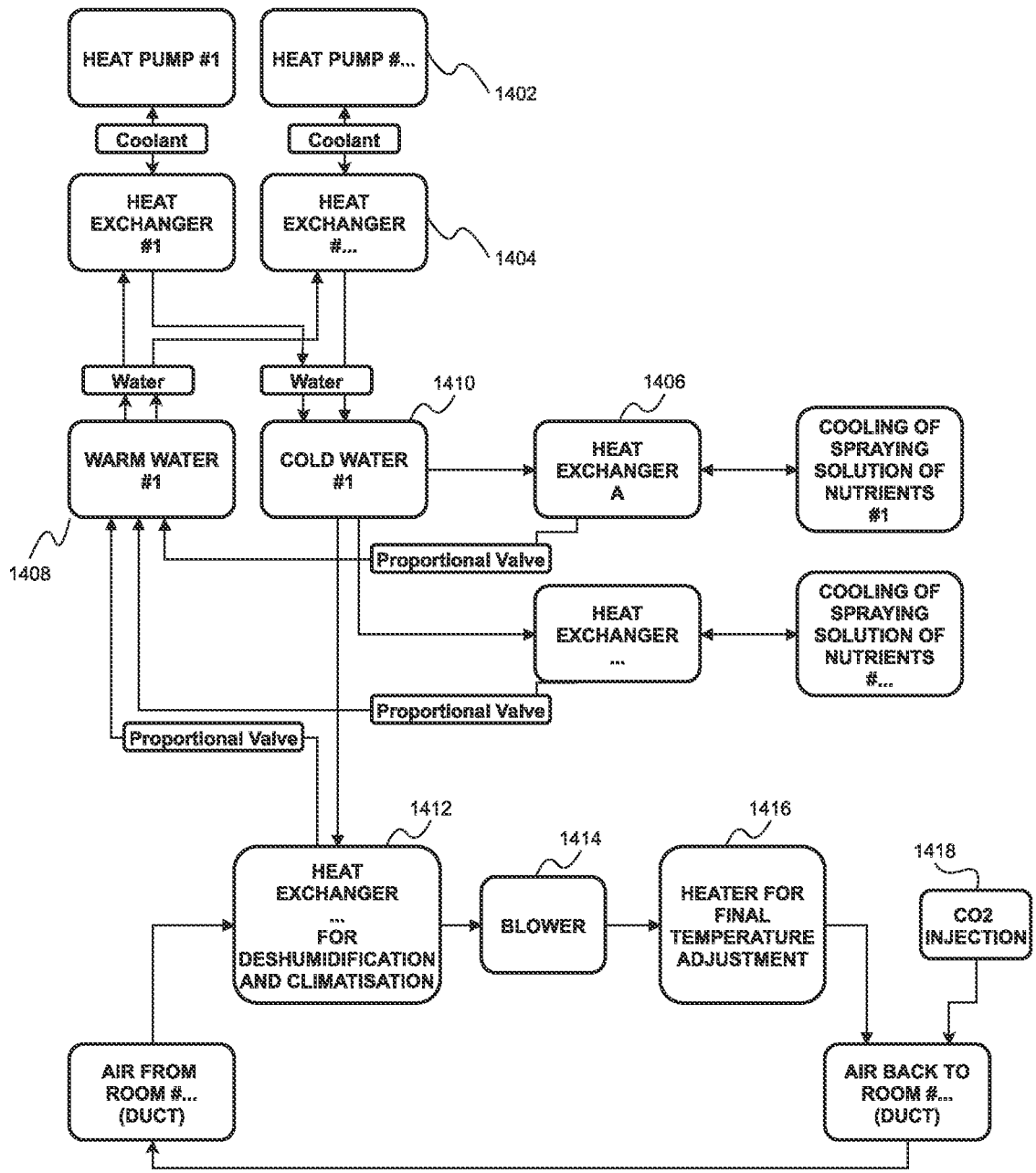
FIG. 29 is a block diagram illustrating components involved in controlling environmental conditions of the aeroponic growing system.

Referring to FIG. 29, the block diagram shows components involved in environmental control, comprising heat pumps 1402, heat exchangers 1404, 1406 associated with heat pumps 1402 or control of temperature of spraying solutions, warm-water reservoir(s) 1408 and cold-water reservoir(s) 1410. It also comprises heat exchanger 1412, blower 1414 and heater 1416 associated with dehumidification and climatization, and $CO_2$ source 1418 to provide the right controlled environment to the plants to optimize their growth.

Figure 30:
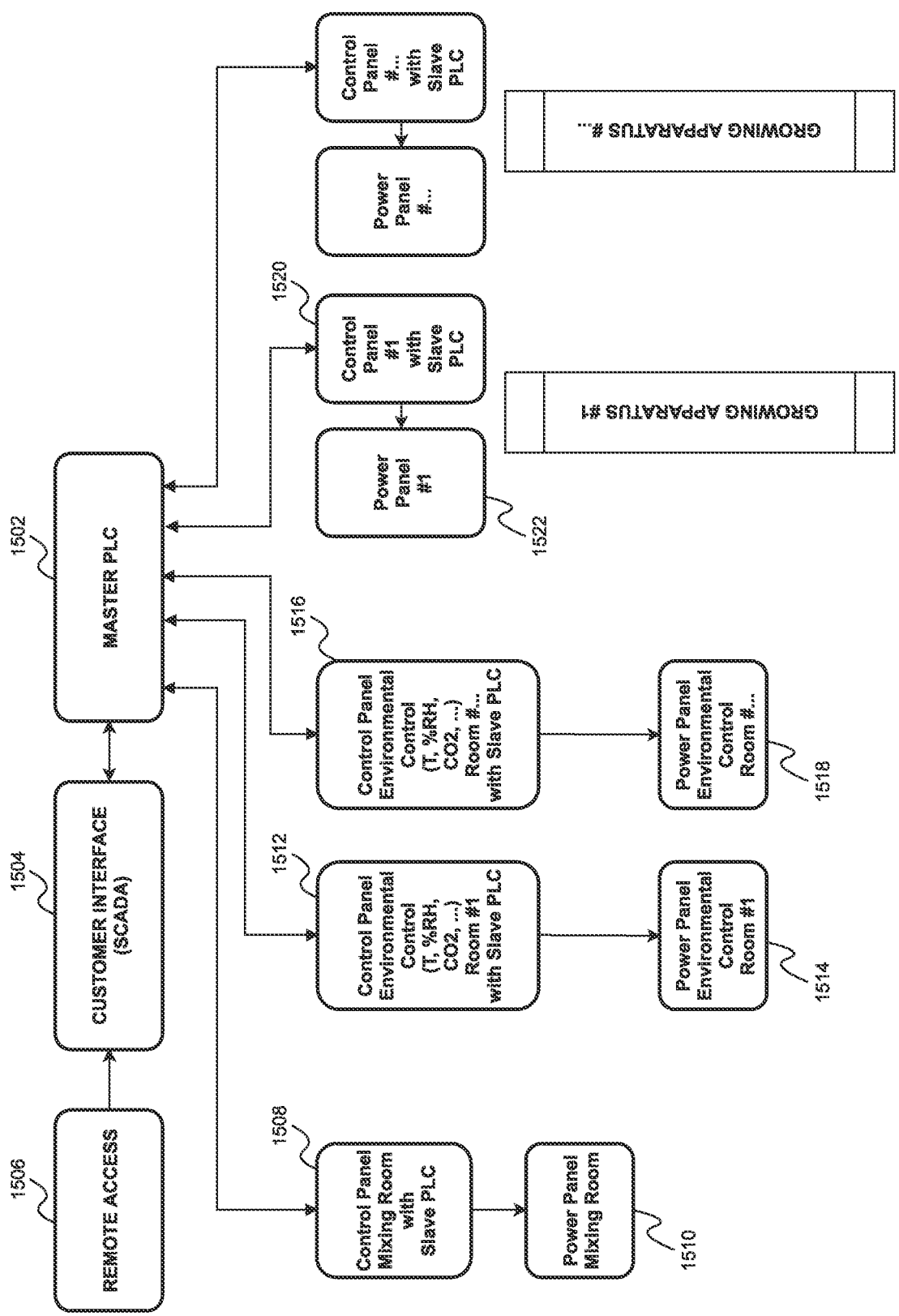
FIG. 30 is a block diagram illustrating modules of the aeroponic growing system.

Referring to FIG. 30, a block diagram depicts the modules participating in the aeroponic growing system S. The modules comprise a master PLC 1502 connected to a customer interface 1504 and a remote access 1506 providing access to controls both on-site and remotely. A control panel 1508 and a power panel 1510 are dedicated to the control of the mixing room where water and nutrients are mixed. The environmental control associated with each room/area are associated a control panel 1512 and 1516 and a power panel 1514, 1516. Associated with each of the aeroponic growing apparatuses A are associated a control panel 1520 comprising a slave PLC, and a power panel 1522. All control panels 1508, 1512, 1516 and 1520 are connected to the master PLC 1502 for central control of all aspects of the aeroponic growing system S. This modular configuration provides scalability to the aeroponic growing system S.

Other features are also contemplated through the present description to take place in the present aeroponic growing system S, such as a solution make-up or replenish system and the provision of a fog of nutrient to the roots of the plants 1014.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

The invention claimed is:

1. An aeroponic growing system, comprising:
   a grow area and a second area distant from the grow area;
   an aeroponic growing apparatus located in the grow area;
   a second apparatus located in the second area;
   an articulated wall having a first face and a second face,
     the articulated wall comprising a plurality of panels interconnected through joints, wherein the joints comprise a flexible joint adapted to selectively engage two of the panels of the articulated wall with each other such that the articulated wall selectively defines a closed carousel, and to selectively disengage the two panels from one another such as having the articulated wall forming an articulated open wall extending between a first extremity and a second extremity, the articulated open wall being moveable between the grow area and the second area, the articulated wall holding a plurality of plant-growing containers adapted for growth of plants with a root section growing generally toward the second face and a stem section of the plants growing generally about the first face, wherein the articulated wall and the joints prevent water to travel between the two faces of the articulated wall; and a motorized railing system connecting the aeroponic growing apparatus and the second apparatus, the motorized railing system comprising a direction switching assembly, wherein the direction switching assembly comprises an inverting station located in the second area and consisting of a closed loop railing that receives the open articulated wall, the motorized railing system being adapted for:
 a) selectively moving the articulated wall between the grow area and the second area, and via the direction switching assembly:
 b) inverting orientation of the articulated wall in the grow area between
  i) a frontward configuration wherein the articulated wall forms a first room in which the first face of the articulated wall is facing inward, and
  ii) a rearward configuration wherein the articulated wall forms a second room in which the second face of the articulated wall is facing inward, wherein the stem section of the plants are arranged towards a first growth condition when the articulated wall is in the frontward configuration and a second growth condition when the articulated wall is in the rearward configuration.

2. The system of claim 1, wherein the aeroponic growing apparatus is adapted to handle the articulated wall into the closed carousel having an interior face and an exterior face, and wherein the aeroponic growing apparatus comprises a first growth promoting system among a lighting system and a nutrient delivery system, wherein the first growth promoting system is located such that the inside face of the carrousel is facing the first growth promoting system.

3. The system of claim 2, wherein first growth promoting system is the nutrient delivery system, the system further comprising a second growth promoting system being the lighting system that is located such that the outside face of the carrousel is facing the lighting system.

4. The system of claim 2, wherein the articulated wall, when in the closed carousel, defines a closed light-insulated chamber bordered by the interior face of the carrousel.

5. The system of claim 2, wherein the articulated wall comprises a quantity N of the panels housing the plants, wherein the nutrient delivery system is adapted to deliver simultaneously the nutrient to the plants of a maximum of a quantity M of the panels, wherein M<N, wherein the motorized railing system is adapted to rotate the articulated wall as the closed carousel to sequentially deliver the nutrient to the plants of the N panels.

6. The system of claim 1, wherein the motorized railing system comprises:

an aerial rail from which is suspended the articulated wall; and
a driven wall engaging means adapted to move the articulated wall along the aerial rail.

7. The system of claim 6, within the engaging means engages both the first face and the second face when moving the articulated wall.

8. The system of claim 7, wherein the articulated wall comprises a top edge and wherein the wall engaging means is adapted to engage the articulated wall about the top edge.

9. The system of claim 8, wherein at least one of the panels comprises a rail connecting means adapted to cooperate with the aerial rail to suspend the panel from the aerial rail.

10. The system of claim 6, wherein the aeroponic growing apparatus comprises a pan below a portion of the aerial rail, and wherein the pan is fluidly connected to a nutrient delivery system.

11. The system of claim 1, wherein the plant-growing containers are mounted to the articulated wall.

12. The system of claim 1, wherein at least one of the panels and the joints is at least one of opaque and watertight.

13. The system of claim 1, wherein the plant-growing containers define conduits between the first face and the second face, and wherein a plant and a planting medium combination is adapted to block each of the conduits, thereby preventing light and water to travel between the first face and the second face through the conduits.

14. The system of claim 13, wherein the plant-growing containers comprises a sloped face facilitating the plants growing therein to have a stem section extending at least partially upward about the first face and the root section hanging about the second face.

15. The system of claim 1, wherein the articulated wall comprises a plurality of openings of an opening shape and wherein the plant-growing containers have a base having a base shape adapted to cooperate with the opening shape to provide a light-blocking and watertight cooperation therebetween.

16. The system of claim 1, wherein the grow area and the second area are defining two environmentally controlled areas closable from each other.

17. The system of claim 1, wherein the railing system is adapted to selectively disengage the articulated wall therefrom.

18. The system of claim 1, wherein the articulated wall is a first articulated wall, the system further comprising a second articulated wall, and wherein the motorized railing system is adapted to move the second articulated wall independently from the first articulated wall.

19. The system of claim 1, wherein the second apparatus comprises at least one of:
 a) a movable platform adapted to process the plants housed on the articulated wall, and
 b) a cleaning station adapted to clean the articulated wall when free of the plants.

* * * * *